US005363574A

United States Patent [19]

Osadchuk

[11] Patent Number: 5,363,574

[45] Date of Patent: Nov. 15, 1994

[54] PIPELINE PADDING APPARATUS

[76] Inventor: Mark Osadchuk, 10040 Happy Valley Rd., Scottsdale, Ariz. 85255

[21] Appl. No.: 34,133

[22] Filed: Mar. 22, 1993

Related U.S. Application Data

[60] Division of Ser. No. 538,924, Jun. 15, 1990, Pat. No. 5,195,260, which is a continuation-in-part of Ser. No. 255,720, Oct. 11, 1988, abandoned.

[51] Int. Cl.[5] .......................... E02F 5/22; F16L 1/028

[52] U.S. Cl. .................................. 37/142.5; 405/179; 209/241

[58] Field of Search ...................... 37/4, 7, 8, 9, 142.5, 37/304, 305, 306; 405/179; 209/235, 421, 420, 460, 241, 257

[56] References Cited

U.S. PATENT DOCUMENTS

| | | | |
|---|---|---|---|
| 230,358 | 7/1880 | Smith . | |
| 531,128 | 12/1894 | Maes . | |
| 953,226 | 3/1910 | Pontius . | |
| 1,058,016 | 4/1913 | Renfro . | |
| 1,276,903 | 8/1918 | Green . | |
| 1,295,996 | 3/1919 | McClain . | |
| 1,397,343 | 11/1921 | Sturtevant . | |
| 1,440,232 | 12/1922 | Muir . | |
| 1,522,724 | 1/1925 | Judson . | |
| 1,560,716 | 11/1925 | Newdick | 198/731 |
| 1,681,089 | 8/1928 | Bottomley et al. . | |
| 1,690,009 | 10/1928 | Hamilton . | |
| 1,792,148 | 2/1931 | Dobbins et al. . | |
| 1,860,481 | 5/1932 | Royer . | |
| 2,084,887 | 6/1937 | Bennett . | |
| 2,263,779 | 11/1941 | Jeffrey et al. . | |
| 2,300,017 | 10/1942 | Shaffer . | |
| 2,332,600 | 10/1943 | Rapp . | |
| 2,405,622 | 8/1946 | Thomas . | |
| 2,449,608 | 9/1948 | LeMay, Jr. . | |
| 2,503,129 | 4/1950 | Pautz . | |
| 2,511,039 | 6/1950 | Black et al. . | |
| 2,587,918 | 3/1952 | Stout . | |
| 2,594,666 | 4/1952 | Long . | |
| 2,595,398 | 5/1952 | Lewis . | |
| 2,602,388 | 7/1952 | Elliott et al. . | |
| 2,624,415 | 1/1953 | Moose . | |
| 2,694,499 | 11/1954 | Mohrlang et al. . | |
| 2,696,287 | 12/1954 | Foust | 37/4 X |
| 2,708,800 | 5/1955 | Logus . | |
| 2,734,730 | 2/1956 | Talboys . | |
| 2,777,219 | 1/1957 | Brant . | |
| 2,814,387 | 11/1957 | McWilliams . | |
| 2,857,691 | 10/1958 | Curran | 37/142.5 |
| 2,860,783 | 11/1958 | Johnson . | |
| 2,931,529 | 4/1960 | Osterhaus . | |
| 2,947,096 | 11/1960 | Cummings et al. . | |
| 2,974,795 | 3/1961 | Behnke et al. . | |
| 3,030,080 | 4/1962 | Hise et al. . | |
| 3,060,601 | 10/1962 | Reynolds . | |
| 3,190,697 | 6/1965 | Gonski . | |
| 3,210,122 | 10/1965 | Moon . | |
| 3,224,120 | 12/1965 | Wilmoth et al. . | |

(List continued on next page.)

FOREIGN PATENT DOCUMENTS

| | | |
|---|---|---|
| 800197 | 9/1950 | Germany . |
| 943530 | 9/1956 | Germany . |
| 312214 | 12/1989 | Japan . |

*Primary Examiner*—Randolph A. Reese
*Assistant Examiner*—J. Russell McBee
*Attorney, Agent, or Firm*—Crutsinger & Booth

[57] ABSTRACT

An improved pipeline padding apparatus includes a separator for separating fine material out of spoil which is piled along side an excavation, an elevator for transporting spoil to the separator, and a pair of guide projections for guiding spoil into the elevator. A conveyor is provided to transport the separated fine portion of the spoil back into the excavation, thereby padding the pipeline. The separator, the elevator, the guide projections and the vehicle are all mounted on a tracked support vehicle. In one embodiment, the motor of the tracked support vehicle is mounted above and forward of the elevator, which helps reduce the amount of dust that the motor is exposed to during operation. According to another aspect of the invention, the guide projections may be configured to allow excess spoil to flow underneath in such a manner as to smooth out a path for the tracks of the support vehicle.

12 Claims, 22 Drawing Sheets

U.S. PATENT DOCUMENTS

| | | | |
|---|---|---|---|
| 3,256,973 | 6/1966 | Gonski | 198/731 |
| 3,308,563 | 3/1967 | Danek . | |
| 3,314,175 | 4/1967 | Petty et al. . | |
| 3,365,050 | 1/1968 | Taylor . | |
| 3,396,481 | 8/1968 | Hovorak . | |
| 3,439,806 | 4/1969 | Kass et al. . | |
| 3,442,381 | 5/1969 | Johnson . | |
| 3,446,026 | 5/1969 | Fikse . | |
| 3,479,755 | 11/1969 | Schropp | 37/8 |
| 3,507,060 | 4/1970 | Gee et al. . | |
| 3,511,056 | 5/1970 | Jones et al. . | |
| 3,583,168 | 6/1971 | Horton . | |
| 3,596,384 | 3/1971 | Neujahr . | |
| 3,597,927 | 8/1971 | Hemphill . | |
| 3,670,909 | 6/1972 | Holland . | |
| 3,701,422 | 10/1972 | Downey | 209/241 |
| 3,860,291 | 1/1975 | Rausch et al. . | |
| 3,892,443 | 7/1975 | Arentzen . | |
| 3,978,673 | 9/1976 | Schleede . | |
| 3,981,089 | 9/1976 | Burrows . | |
| 4,055,255 | 10/1977 | Vasquez . | |
| 4,055,265 | 10/1977 | Eisenman . | |
| 4,057,917 | 11/1977 | Burrows . | |
| 4,221,505 | 9/1980 | Taylor-Smith . | |
| 4,277,105 | 7/1981 | Taylor . | |
| 4,287,056 | 1/1981 | Dumbaugh et al. . | |
| 4,301,910 | 11/1981 | Price . | |
| 4,344,581 | 8/1982 | Redemann . | |
| 4,377,365 | 3/1983 | Layh . | |
| 4,591,432 | 5/1986 | Hartl . | |
| 4,632,751 | 12/1986 | Johnson et al. . | |
| 4,633,602 | 1/1987 | Layh et al. | 37/142.5 X |
| 4,664,791 | 5/1987 | McClain et al. . | |
| 4,704,811 | 11/1987 | Jefferson . | |
| 4,795,552 | 1/1989 | Yun et al. . | |
| 4,838,734 | 6/1989 | Pinto . | |
| 4,861,461 | 8/1989 | Utterback . | |
| 4,912,862 | 4/1990 | Bishop et al. | 37/142.5 |
| 4,944,108 | 7/1990 | George et al. . | |
| 4,948,299 | 8/1990 | Cronk, Jr. et al. . | |
| 4,961,542 | 10/1990 | Den Besten et al. . | |
| 5,097,610 | 3/1992 | Bishop | 37/142.5 |
| 5,120,433 | 6/1992 | Osadchuk | 37/142.5 X |
| 5,195,260 | 3/1993 | Osadchuk | 37/142.5 |

PIPELINE PADDING APPARATUS

This application is a division of application Ser. No. 07/538,924 filed Jun. 15, 1990, now U.S. Pat. No. 5,195,260 issued Mar. 23, 1993, which is a continuation-in-part of U.S. application Ser. No. 255,720, filed Oct. 11, 1988 now abandoned.

BACKGROUND OF THE INVENTION

1. Field of the Invention

The present invention relates to an apparatus for padding pipe. More particularly, the present invention relates to a pipeline padding apparatus which is faster and more efficient than those heretofore known.

2. Description of the Prior Art

A large demand exists in contemporary society for underground piping, which is used to convey fluids from one location to another. Such piping is commonly coated with plastic or an equivalent protective substance to prevent it from corroding while it is in the ground.

To lay such pipe, an excavation is first usually made with a back hoe or the like, and excavated rocks and soil, which is commonly called spoil, is piled to one side of the excavation. After the pipe is laid in the excavation, the excavation must be filled in by the spoil. However, it is important that large rocks in the spoil do not come into contact with the pipeline, which might breach the coating and cause unnecessary corrosion of the pipeline. For this reason, it is common to fill in the portion of the excavation surrounding the pipe with fine material which is separated out of the spoil. This process is known as padding and, in the past, has been a time consuming and expensive stage of laying an underground pipeline.

It is clear that there has existed a long and unfilled need in the prior art for an apparatus and method for padding pipe which is adaptable to various types of terrain, is effective at preventing accidental dislodging of rocks into an excavation during use, and has a simple and efficient mechanism for separating fine material out of the spoil and transporting it into the excavation.

SUMMARY OF THE INVENTION

Accordingly, it is an object of the present invention to provide an apparatus and method for padding pipe which is adaptable to all types of terrain, effective at preventing the accidental dislodgment of rocks into an excavation during use, and provides an efficient yet simple mechanism for separating fine material out of the spoil and transporting it into an excavation.

A pipeline padding apparatus constructed according to a first aspect of the invention includes a support vehicle adapted for moving relative to a trough and associated spoil; structure on the vehicle for elevating spoil in an elevating direction from a forward end to a rearward end; structure connected to the forward end of the elevating structure for guiding spoil into the elevating structure; separating structure on the vehicle for receiving spoil from the elevating structure and for separating the spoil into fine material and rough material; conveying structure on the vehicle for receiving the fine material from the separating structure and for conveying the fine material into the trough; and structure for applying a downward force to the guide structure, whereby the guide structure is more stable relative to the spoil during operation.

An apparatus constructed according to a second aspect of the invention includes a support vehicle adapted for moving relative to a trough and associated spoil; structure on the vehicle for elevating spoil in an elevating direction from a forward end to a rearward end; separating structure on the vehicle for receiving spoil from the elevating structure and for separating the spoil into fine material and rough material; conveying structure on the vehicle for receiving the fine material from the separating structure and for conveying the fine material into the trough; and a pair of guide members for guiding spoil into the forward end of the elevating structure, each of the guide members having a first end which is connected to the elevating structure, an inner guide surface for engaging and directing spoil toward the elevating structure when the support vehicle moves forward and a bottom edge for allowing excess spoil to escape thereunder, whereby spoil is efficiently guided into the elevating structure.

A pipeline padding apparatus constructed according to a third aspect of the invention may include a support vehicle adapted for moving relative to a trough and associated spoil; structure on the vehicle for elevating spoil in an elevating direction from a forward end to a rearward end, the elevating structure including an elevator floor, a plurality of flat members each having a smooth floor engaging surface and a spoil engaging surface and at least three driving chains connected to the flat members for driving the flat members in a path along the elevator floor; structure connected to the forward end of the elevating structure for guiding spoil into the elevating structure; separating structure on the vehicle for receiving spoil from the elevating structure and for separating the spoil into fine material and rough material; and conveying structure on the vehicle for receiving the fine material from the separating structure and for conveying the fine material into the trough.

An apparatus for padding pipe according to a fourth aspect of the invention may include a support vehicle adapted for moving relative to a trough and associated spoil; structure on the vehicle for elevating spoil in an elevating direction from a forward end to a rearward end; separating structure on the vehicle for receiving spoil from the elevating structure and for separating the spoil into fine material and rough material, the separating structure including an inclined chute for receiving the fine material and structure for imparting vibration to the chute; and conveying structure on the vehicle for receiving the fine material from the tray and for conveying the fine material into the trough.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

1. The Embodiment of FIGS. 1–16

Figure 1:
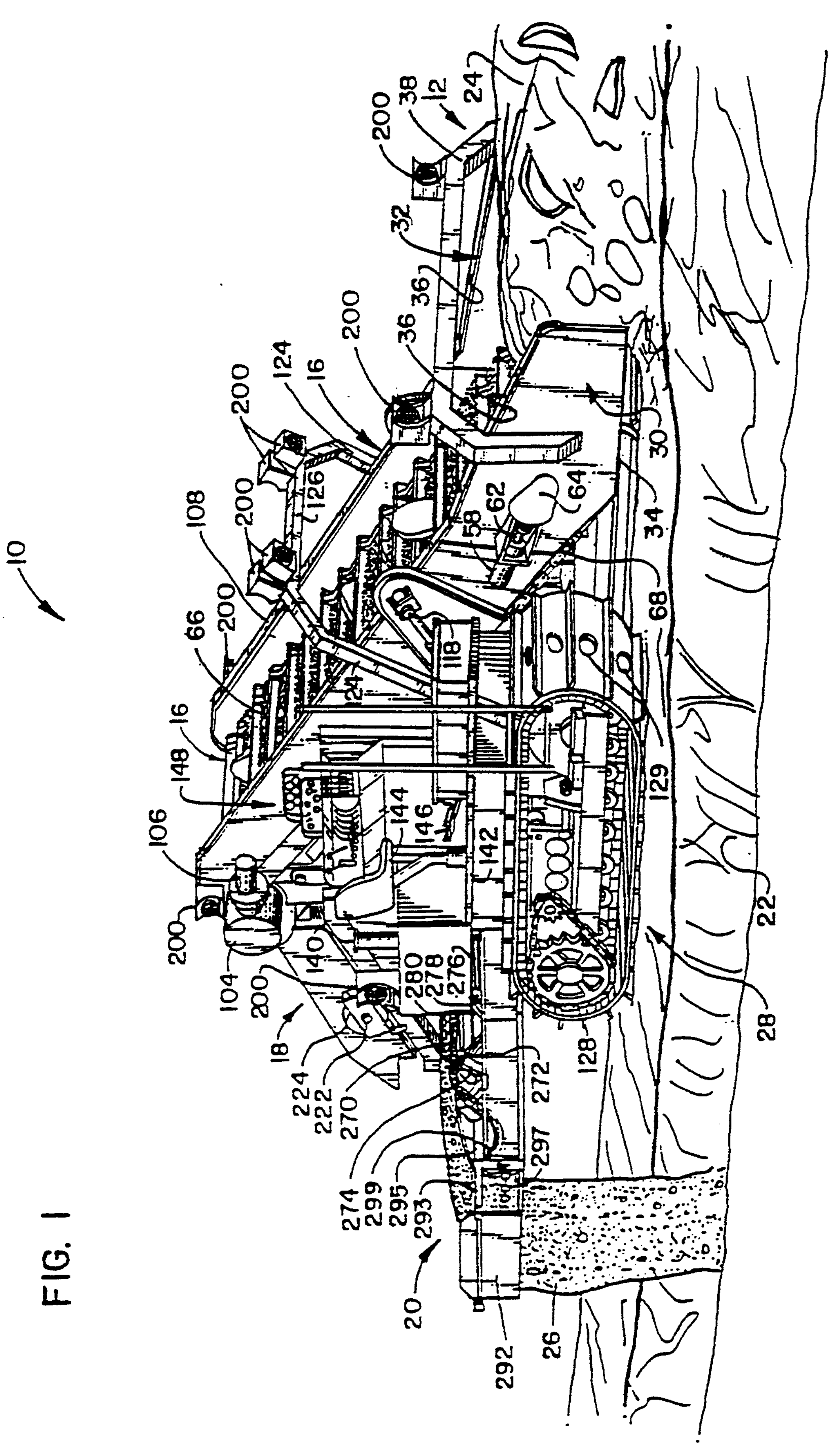
FIG. 1 is a perspective view of a pipeline padding assembly constructed according to a first embodiment of the invention.
Figure 2:
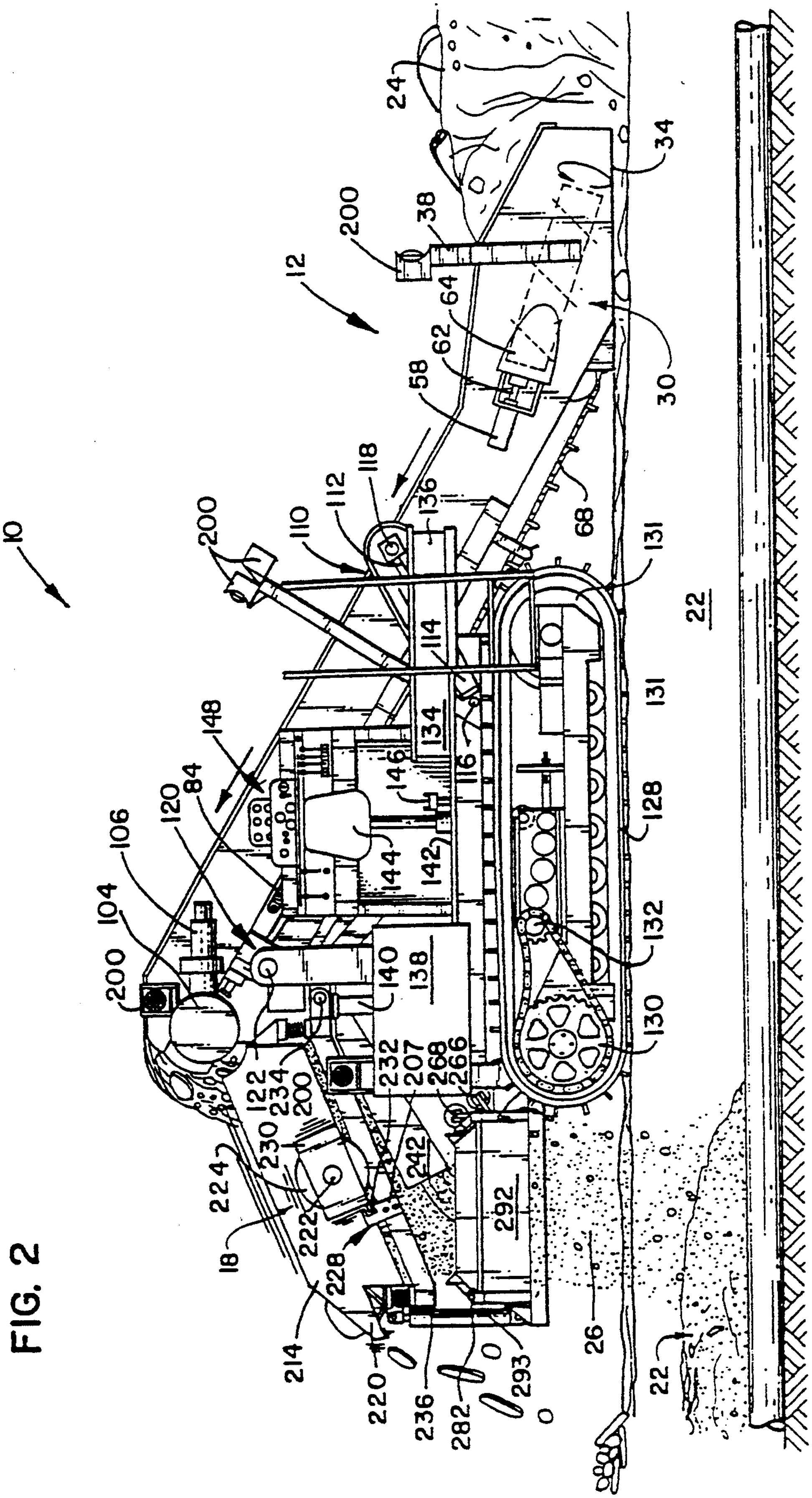
FIG. 2 is a side elevational view of the pipeline padding assembly illustrated in FIG. 1.
Figure 3:
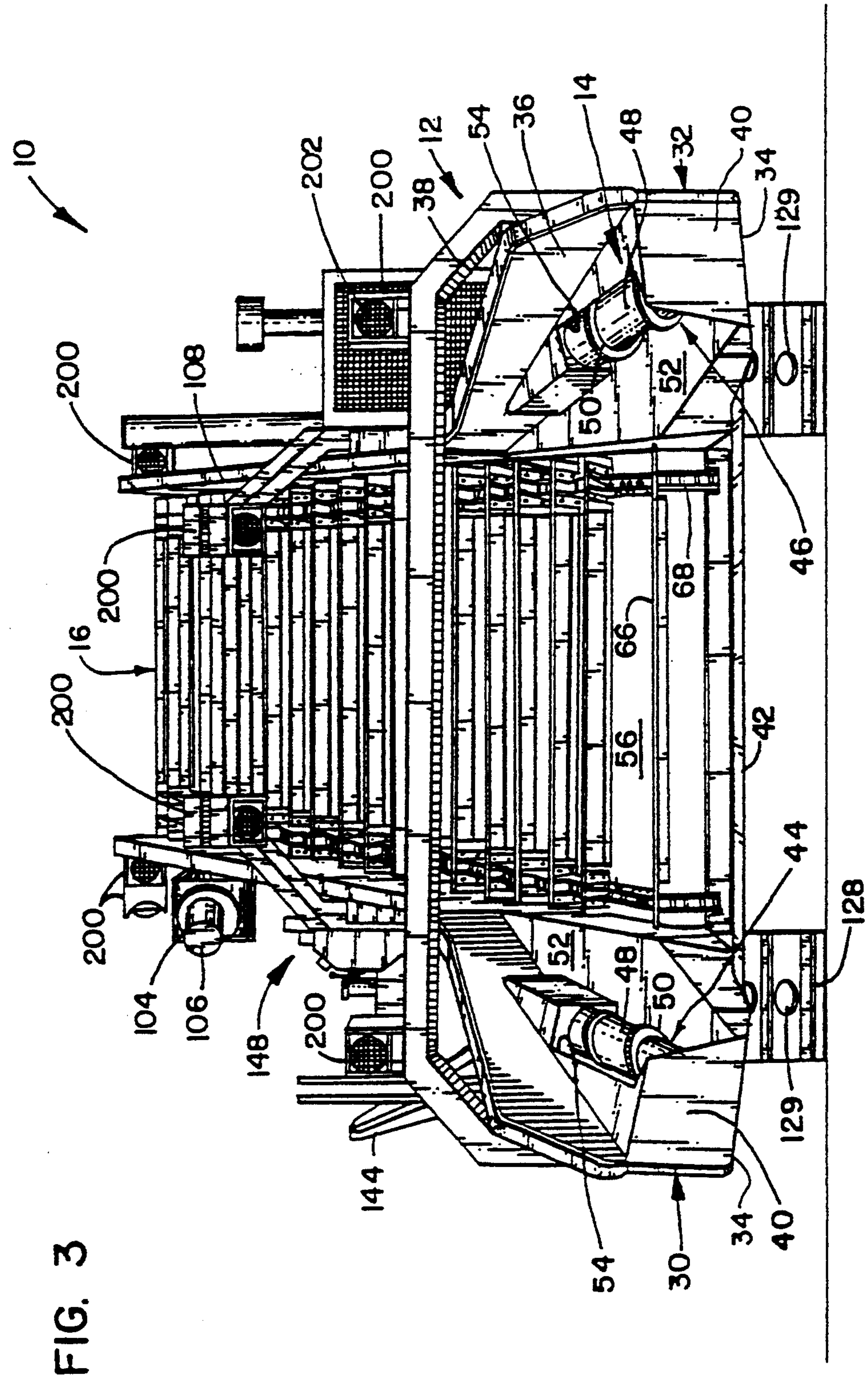
FIG. 3 is a front elevational view of the pipeline padding assembly illustrated in FIG. 1.

Referring now to the drawings, wherein like reference numerals designate corresponding elements throughout the views, and particularly referring to FIGS. 1–16, an improved pipeline padding assembly according to a first preferred embodiment of the invention is illustrated. Referring first to FIG. 1, pipeline padding assembly 10 is adapted to be positioned adjacent an excavation 22 so that a spoil guide assembly 12 on assembly 10 is adjacent a pile of spoil 24 which has been removed from excavation 22. As is best seen in FIG. 3, a directing assembly 14 is provided for directing spoil from the spoil guide assembly 12 onto an elevator or transporting assembly 16, which conveys the spoil in an elevating direction and drops the spoil onto a separator assembly 18. As used herein, the terms "elevator means" or "spoil elevator" are used in a generic sense to mean any structure for elevating or lifting materials. As will described in detail below, separator assembly 18 separates the spoil into fine material 26 and rough material, and allows the fine material to drop down onto a conveyor assembly 20, which conveys the fine material 26 back into the excavation 22 in order to pad pipeline therein. As used herein, the terms "separator" or "spoil separator" are used in a generic sense to refer to any structure for separating ground or earth materials into fine materials and rough materials. The term "conveyor" is also used in its generic sense to means any structure for transporting material, for example, belt type conveyors.

As is shown in FIG. 1, spoil guide assembly 12, directing assembly 14, elevator assembly 16, separator assembly 18 and conveyor assembly 20 are mounted for movement on a self-propelled tracked vehicle 28. Vehicle 28 provides vehicular support for the above-identified elements. As used herein, the term "vehicle" is used in its ordinary sense and meaning to refer to any structure for use in transporting something. As a result, the entire assembly 10 may be moved along side an excavation at a contracting site in order to quickly and efficiently pad a pipeline.

Figure 6:
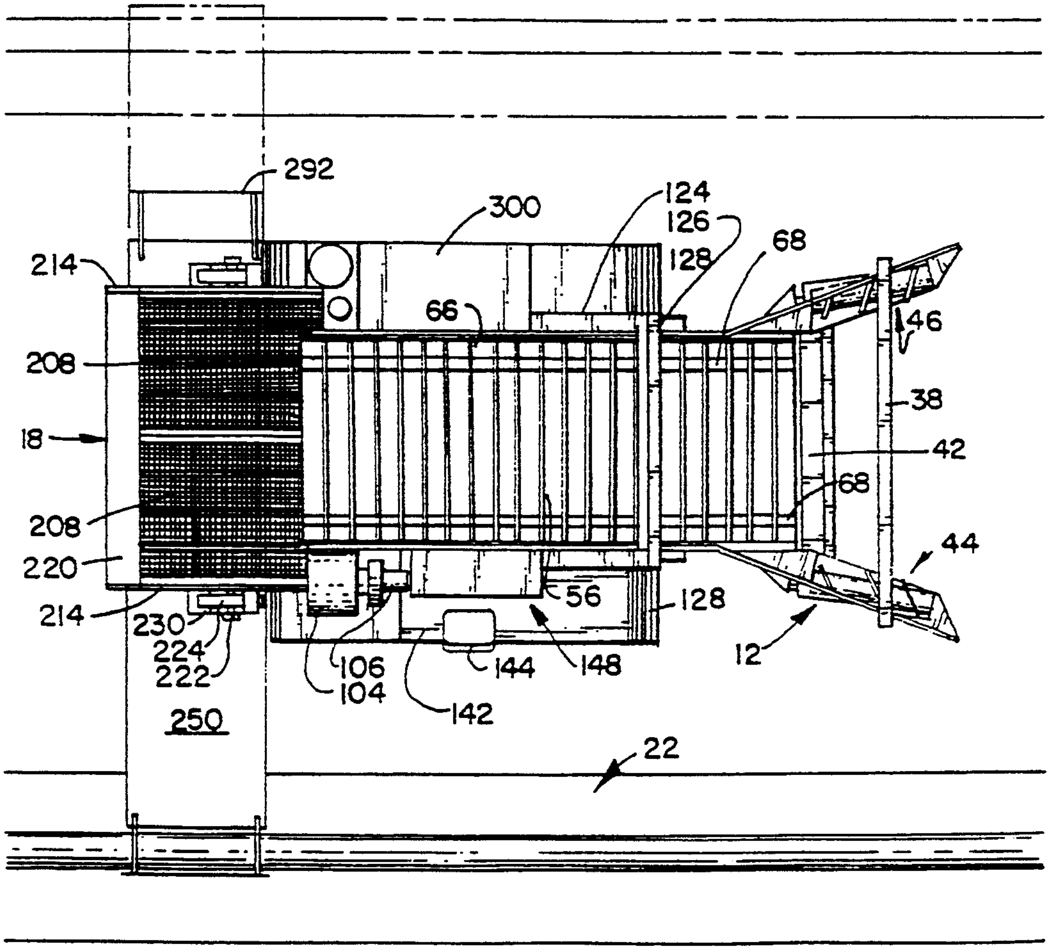
FIG. 6 is a top plan view of the assembly illustrated in FIG. 1.

As best shown in FIGS. 1 and 3, spoil guide assembly 12 includes a first guide projection 30 and a second guide projection 32 which are unitary with elevator side guard portions 108 of the elevator assembly 16. As shown in FIG. 3, first and second guide projections 30, 32 flare outwardly from a center line which would bisect elevator assembly 16 in the elevating direction. Each of the first and second guide projections 30, 32 include a ground engaging lower surface 34 which is formed to be substantially parallel to the surface upon which self-propelled tracked vehicle rests, although its actual position varies in accordance with the position of elevator assembly 16 as shown, surfaces 34 are substantially that. Each of the projections 30, 32 further include an upwardly projecting side guard portion 36 which prevents spoil from spilling thereover, which might result in damage to the pipeline in the excavation. An overhead structural support 38 is provided which rigidly connects the first and second guide projections 30, 32. As shown guide projections 30 and 32 form an open bottomed structure for the spoil. Each of the guide projections 30, 32 further include an inner guide surface 40 which is angled obliquely inwardly and in the elevating direction to guide spoil inwardly toward elevator assembly 16 and directing assembly 14. As is illustrated in FIGS. 3 and 6; the elevator assembly 16 includes a cutting blade 42 positioned at the front lower end thereof. The blade 42 has a sharpened front edge and extends between first guide projection 30 and second guide projection 32 in order to help separate spoil from an underlying surface.

Referring again to FIG. 3, directing assembly 14 preferably includes a right auger assembly 44 and a left auger assembly 46, which are mounted within recesses 54 provided in the first and second guide projections 30, 32, respectively. Each of the right and left auger assemblies 44, 46 include an auger element having a central drum 48 and helical flight 50. Central drum 48 preferably has a radius that is greater than the radial extent of helical flight 50 so that rocks and other large elements are less likely to become stuck in recesses 54. A pair of guide floors 52 are defined in the corresponding projections 30, 32 adjacent and roughly parallel to the lower extent of each of the right and left auger assemblies 44, 46, as is shown in FIG. 3. Right auger assembly 44 is driven by a hydraulic motor 58 through a drive shaft 62 which extends through an auger drive cowling 64, as is shown in FIG. 1. Left auger assembly 46 is provided with a similar motor and drive arrangement, and a control system is provided for controlling operation of both of these motors, as is below described.

In operation, left and right auger assemblies 46, 44 will direct spoil from spoil guide assembly 12 inwardly toward the center of elevator assembly 16, and further in the elevating direction.

Figure 5:
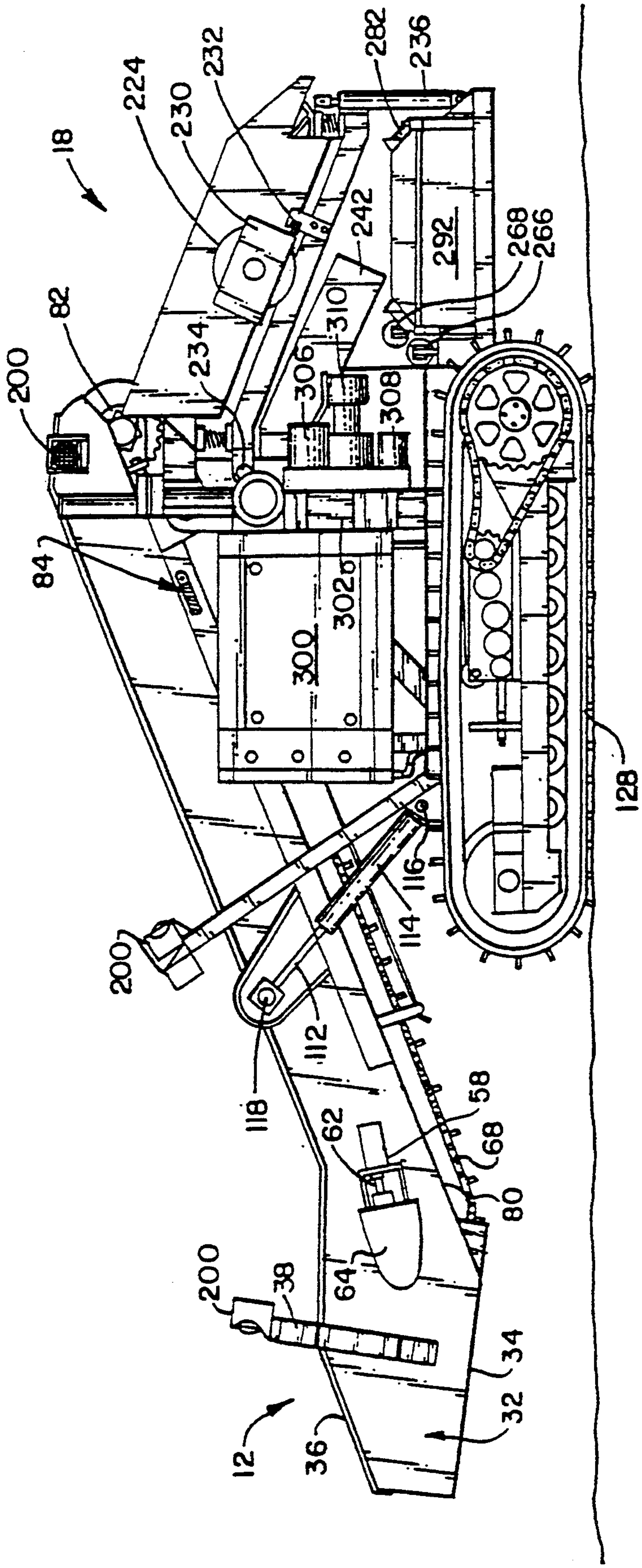
FIG. 5 is an opposite side elevational view of the pipeline padding assembly of FIG. 1.
Figure 8:
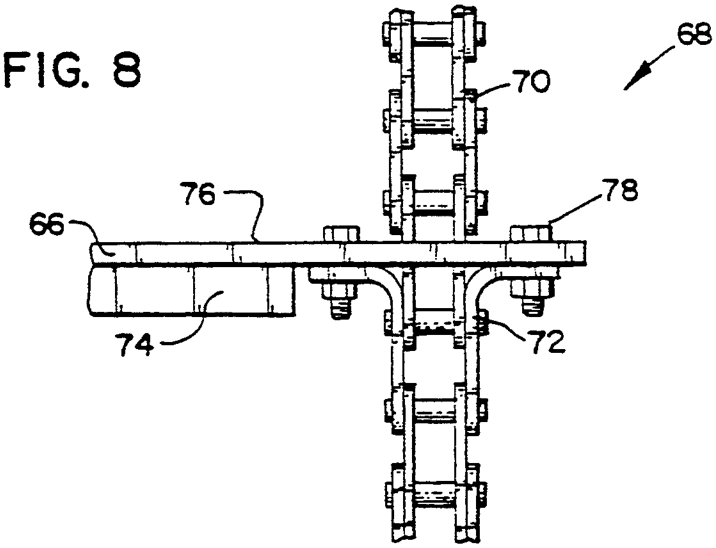
FIG. 8 is an isolated plan view of an elevator chain according to the embodiment of FIG. 1.
Figure 9:
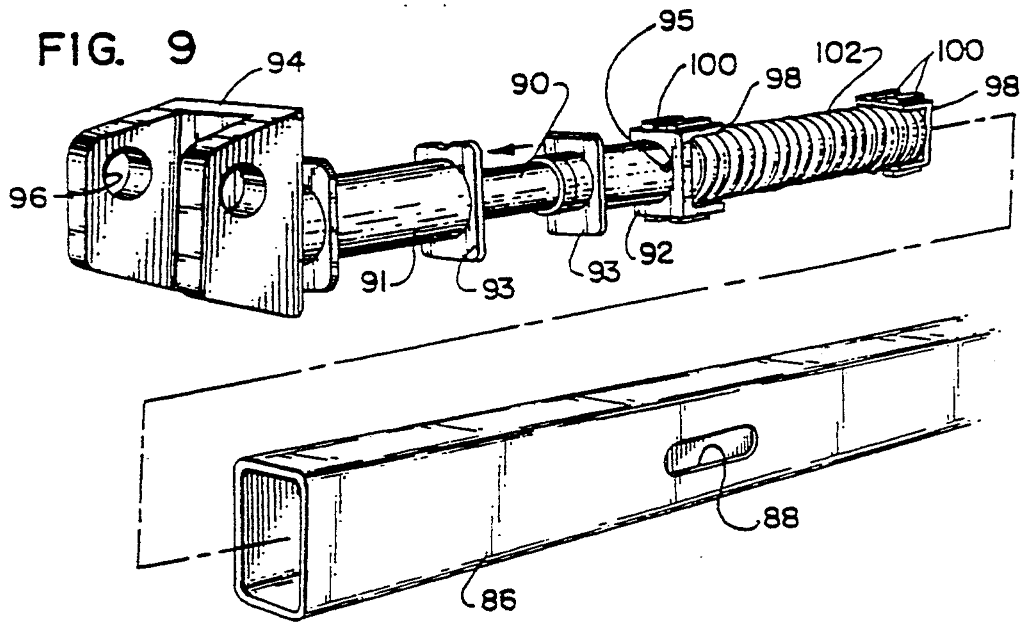
FIG. 9 is an isolated assembly view of a hydro adjuster mechanism used in the embodiment of FIG. 1.

As shown in FIG. 3, elevator assembly 16 includes an elevator support floor 56 which is substantially at the same level as the guide floor 52 in directing assembly 14. Referring briefly to FIG. 8, a number of flat members 66 are adapted to be drawn across elevator floor 56 in order to transport spoil in the elevating direction to the separator assembly 18. Each of the flat members 66 have a spoil engaging surface 76 and a support brace 74 extending along a rear surface to increase the rigidity thereof. As is also shown in FIG. 8, flat members 66 are joined to a pair of elevator chains 68 by a respective pair of flat support brackets 72, which are joined to flat members 66 by a pair of nut-bolt connections 78. Each of the elevator chains 68 are formed of a plurality of links 70 and are guided in a closed endless path around a lower elevator sprocket 80 and an upper elevator sprocket 82, as is best seen in FIG. 5. In order to provide the proper biasing between sprockets 80, 82, a hydro-adjuster assembly 84 is provided for each of the chains 68, as is shown in FIGS. 2 and 5. Referring briefly to FIG. 9, each hydro-adjuster 84 includes a journal bracket 94 having a pair of journal holes 96 defined therein for supporting an axis which supports each of the upper elevator sprockets 82. Journal bracket 94 is resiliently connected to a support member 86, which is integral with an axis supporting the lower elevator sprockets 80 for rotation. Journal bracket 94 has a shaft 91 extending therefrom which terminates in a piston portion 90. Piston portion 90 is slidably received within a cylinder 92 that has an orifice defined therein which may be filled with pressurized grease through an orifice 95. A pair of blocks 98 are mounted on cylinder 92 and are biased apart by a compression spring 102. A number of tabs 100 are provided on outer surfaces of each of the blocks 98. A number of guide plates 93 are provided on shaft 91 to guide the assembly within the interior of support member 86, as is shown in FIG. 9. The distal block 98 is adapted to contact a stop within support member 86 in order to limit penetration of hydro-adjuster assembly 84 into support member 86. In operation, biasing between sprockets 80, 82 may be adjusted by introducing or withdrawing pressurized grease through orifice 95. However, if a rock or other large object should become stuck between an elevator chain 68 and one of its support sprockets 80, 82, the hydro-adjuster assembly 84 will deflect by compressing spring 102 so that the additional tension on the chain 68 does not result in catastrophic failure of the entire elevator assembly 16. Referring again to FIG. 1, a hydraulic drive motor 106 is connected to the upper elevator sprockets 82 by an elevator drive transmission 104, which, in the preferred embodiment, is of the planetary type.

According to one novel and important aspect of the invention, the entire elevator assembly 16, along with the spoil guide and directing assemblies 12, 14 are pivotable about a pivot shaft 122 through a pivotal mounting assembly 120, as is shown in FIG. 2. Pivotal mounting assembly 120 is positioned at one end of elevator assembly 16 that is closest to upper elevator sprocket 82. A pair of elevator lifting assemblies 110 are provided on each side of the elevator assembly 16. Elevator lifting assemblies 110 include cylinders 114 which have pistons 112 received therein. Cylinders 114 are connected to pivot points 116 provided on a frame of vehicle 28, and pistons 112 are connected at pivot points 118 to the side guard portions 108 of the elevator assembly 16. Operation of each of the elevator lifting assemblies 110 is controlled by a central control system, which will be described in detail below.

As is shown best in FIG. 1, a pair of lateral guide posts 124 are provided for giving lateral support to elevator assembly 16 when it is pivoted about mounting assembly 120 by the lifting assemblies 110. A cross-bar 126 is provided to give additional rigidity to the guide post 124 as is illustrated in FIG. 1. Self-propelled tracked vehicle 28 includes a pair of endless track elements 128 having holes 129 defined therein so that mud, snow or soil does not collect within the track elements 128. Tracks 128 are mounted on rollers 131 shown in FIGS. 5 and 15 of the drawing and provided with a conventional guide structure. As used herein the term "wheel" is used in a broad sense to refer to any ground engaging structure capable of turning about an axle. Each track 128 is driven by a drive sprocket 130 which is driven via a chain from a hydraulic motor output sprocket 132. As is shown best in FIG. 2, vehicle 28 includes an operation support platform 142 having a battery box 134 and tool box 136 disposed thereon. A seat 144 is provided on operator platform 142 for supporting an operator. A field tank 138 having a fill spout 140 is provided on an opposite side of platform 142 from the battery box 134 and tool box 136. Adjacent seat 144 is a control panel 148 and a clutch pedal 146, the purpose of which will be described in more detail below.

Figure 7:
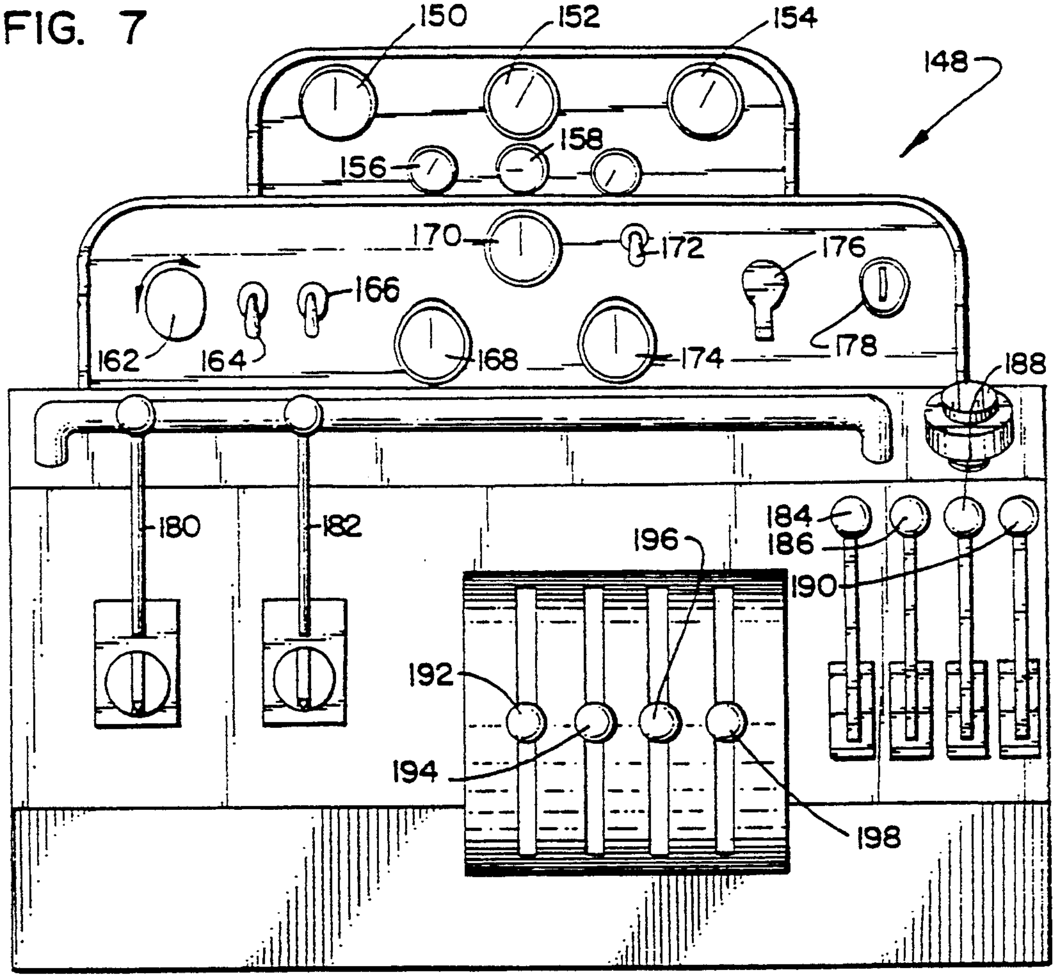
FIG. 7 is an isolated elevational view of a control panel for an apparatus constructed according to the embodiment of FIG. 1.

Referring to FIG. 7, control panel 148 includes a left track charge pump pressure indicator 150, a right track charge pump pressure indicator 152 and an elevator charge pump pressure indicator 154 on a top portion thereof. Just beneath indicators 150, 152 and 154 is an elevator drive motor gauge 156, a left auger drive motor pressure gauge 158 and right auger drive motor pressure gauge 160. A master light control switch 162 is provided for controlling a number of lamps 200 that are provided about the assembly. A left auger control switch 164 and a right auger control switch 166 are provided adjacent light control switch 162. An engine water temperature gauge 168 and engine oil temperature gauge 170 are mounted adjacent auger switches 164, 166 along with an engine voltage indicator 174. A track drive high-low speed switch 172 is provided above voltage indicator 174. A starter switch 176 is provided to initiate combustion in the main diesel engine which is provided on the self-propelled tracked vehicle 28, and a master kill switch 178 is provided to cut power throughout the entire pipeline padding assembly 10. On a lower portion of control panel 148 is a shaker speed control lever 180 and conveyor speed control lever 182. To the right of levers 180, 182 is a shaker lift control lever 184, a conveyor shift control lever 186, a conveyor tilt control lever 188 and an elevator lift control lever 190, each having functions which will be described in more detail below.

Mounted in a box beneath the above-mentioned group of control levers is an elevator chain speed control lever 198, and three levers for controlling operation of the track drives for vehicle 28. Specifically, both the left and right tracks 128 of vehicle 28 may be controlled together by a master control lever 192, which is capable of controlling both the direction and the speed of the tracks. Also provided are a left side track travel adjustment lever 194 and a right side track travel adjustment lever 196, each of which is adapted to change the speed or reverse the direction of its respective track relative to the input provided by the master control lever 192, as will be explained in more detail below.

Figure 4:
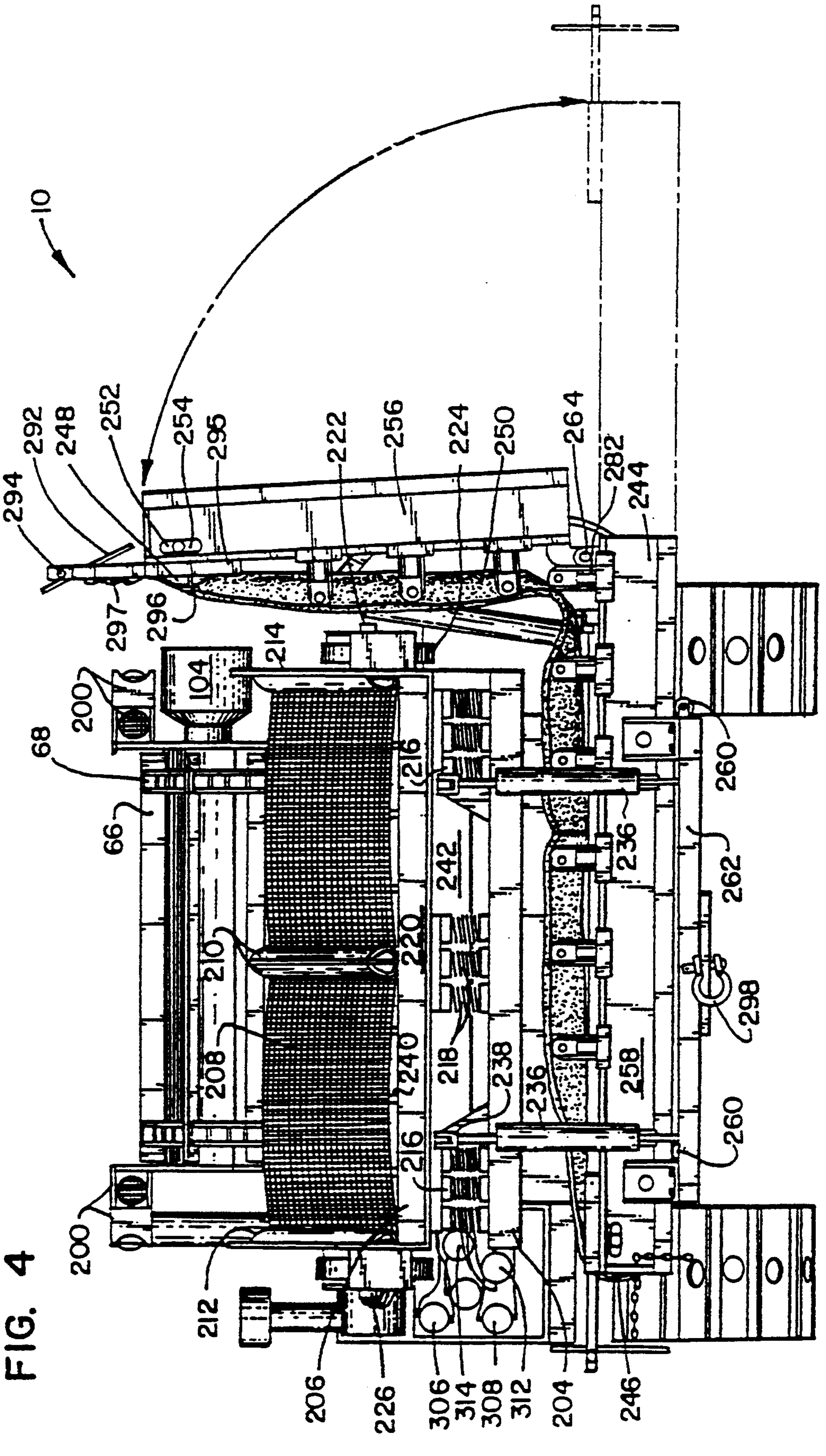
FIG. 4 is a rear elevational view of the pipeline padding assembly of FIG. 1.

Referring now to FIGS. 1 and 4, separator assembly 18 includes a shaker support frame 204 and a holding frame 206 which has a screen element 208 mounted thereto by a central hold down rib 210 and a number of screen securing brackets 212. The mesh size given screen element 208 is predetermined according to the maximum diameter of fine material which is desired to be returned to the excavation atop the coated pipeline. A pair of shaker side guards 214 are provided on each side of the screen element 208 to prevent spoil received from elevator assembly 16 from escaping laterally during the separation process.

As is best seen in FIG. 4, holding frame 206 is resiliently mounted with respect to shaker support frame 204 by a plurality of compression springs 218, which are mounted within cup-like compression spring holders 216 provided on both shaker support frame 204 and holding frame 206. A roughs chute 220 is provided on a rear edge of holding frame 206 for guiding the separated rough portion of the spoil rearwardly off the back end of the assembly 10.

As may be seen in FIG. 1, a shaft 222 is mounted in bearings which are provided on the holding frame 206, and has a pair of eccentric weights 224 secured for rotation therewith. A hydraulic shaft rotating motor 226 (See FIG. 4) is provided for rotating shaft 222 according to the position of shaker speed control lever 180, as will be described in detail below. A guard 230 is provided over each of the eccentric weights 224 to prevent accidental contact with the hands of an operator or the like. In addition, a safety stop arrangement-228 is provided for limiting relative movement between support 204 and holder frame 206, as is shown in FIGS. 2 and 4. In the preferred embodiment, a tab 232 is mounted on holding frame 206 for reciprocation between a pair of stops on a bracket 207 which is attached to support frame 204.

As may be seen in FIG. 2, the shaker support frame 204 is pivotally mounted with respect to the frame of vehicle 28 at a pivot point 234. A pair of shaker tilt piston-cylinder couples 236 are pivotally mounted to the frame of vehicle 28 and to brackets 238 provided on support frame 204 in order to selectively pivot the separator assembly 18 about pivot points 234. As a result, an operator can compensate for differences in surface inclination or spoil consistency that would otherwise effect the operating efficiency of the separating assembly 18. Operation of the shaker tilt piston-cylinder couples 236 is controlled through lever 184 on the control panel 148 via a control system, which will be described in detail below.

In order to provide further support for screen element 208 on holding frame 206, a number of support ribs 240 are provided beneath screen element 208 and attached to holding frame 206. In addition, a fines chute 242 is provided beneath holding frame 206 for guiding the fine portion of the spoil to the conveyor assembly 20.

Referring first to FIG. 4, the structure of conveyor assembly 20 will now be discussed. Conveyor assembly 20 includes a conveyor frame 244 which is mounted for lateral movement relative to vehicle body frame 262 by a plurality of conveyor frame support rollers 260. Conveyor frame 244 is subdivided into a first conveyor portion 256 and a second conveyor portion 258 which is connected to first portion 256 by means of a hinge 264. A first drive drum 246 having a hydraulic motor therein is mounted for rotation on second conveyor portion 258. Likewise, a second drive drum 248 also having a hydraulic motor therein is mounted for rotation on and relative to first conveyor portion 256. Access slots 254 are provided in the first and second conveyor portions 256, 258 for adjusting second and first drive drums 248, 246.

As shown in FIG. 4, an endless conveyor belt 250 is stretched between the first and second drive drums 246, 248. Referring briefly to FIGS. 1 and 2, a piston-cylinder unit 268 is provided for tilting the first conveyor portion 256 relative to second conveyor portion 258. Piston-cylinder unit 268 includes a conveyor tilt piston arm 270 which is pivotally mounted to a projection 274 on first conveyor portion 256 by a pivot point 272. When piston-cylinder unit 268 is caused to contract by the control system, the first conveyor portion 256 is caused to tilt upwardly with respect to second conveyor portion 258, as is shown in FIG. 4. This position is used when transporting the assembly. When the control system causes piston-cylinder unit 268 to expand, first conveyor portion 256 is lowered so that its axis is substantially collinear with that of second conveyor portion 258, as is shown in phantom lines in FIG. 4. In this latter position, the fine portion of the spoil received from separator assembly 18 may be conveyed atop endless conveyor belt 250 by causing the hydraulic motors within the first and second drive drums 246, 248 to turn the respective drums, which is accomplished by the control system.

In order that the pipeline padding assembly 10 of the invention can work on both sides of an excavation, or in both directions on any particular side of an excavation, conveyor frame 244 is made shiftable in a lateral direction so that the conveyor assembly 20 can be extended outwardly over the pipeline to padded. To this end, a conveyor slide piston-cylinder unit 266 is provided having an actuation arm 276 secured to a projection 280 on conveyor frame 244 by means of a pin 278. When piston-cylinder unit 266 is caused to expand, conveyor frame 244 slides over support rollers 260 to the right, as viewed in FIG. 4. When piston-cylinder unit 266 is caused to contract, conveyor frame 244 slides to the left, as viewed in FIG. 4. Operation of piston-cylinder unit 266 is controlled via the central control system, as will be discussed in detail below.

Figure 10:
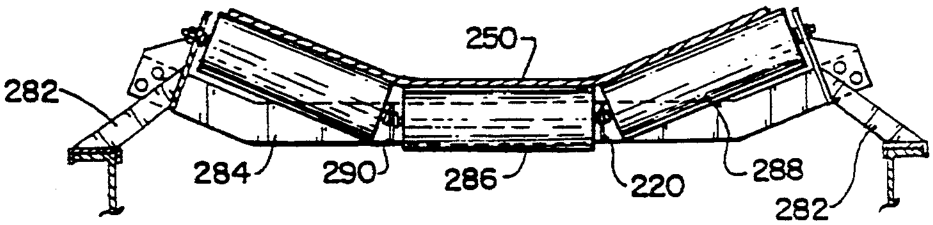
FIG. 10 is a cross-sectional view through a conveyor assembly portion of the embodiment of FIG. 1.

Referring briefly to FIG. 10, an assembly is provided for supporting the top run of the endless conveyor belt 250. A plurality of roller support arms 282 and a corresponding number of central support brackets 290 support for rotation a corresponding number of rear belt guide rollers 284, central belt guide rollers 286 and front belt guide rollers 288. As is shown in FIG. 10, the rear and front belt guide rollers 284, 288 are inclined so as to center the fine portion of the spoil received from separator assembly 18 on endless belt 250. The provision of rollers 284, 286, 288 allow conveyor assembly 20 to operation at a higher capacity than would otherwise be possible.

Referring again to FIGS. 1 and 4, a deflector plate 292 is pivotally mounted on a pair of extension arms 293 which are adjustably arranged to extend from support sleeves 295 on the conveyor frame 244. Deflector plate 292 is provided to deflect the fine material thrown off conveyor belt 250 downwardly into the excavation on top of the pipeline to be padded. In order to limit pivoting of deflector plate 292 relative to the extension arms 293, a chain 297 may be secured to deflector plate 292 and adjustably fastened within a keyhole mount 299 on the conveyor frame 244, as is shown in FIG. 1. Adjustment studs 296 may be provided in the support sleeves 295 to bear down upon extension arms 293 when tightened, thereby locking the extension arms in position relative to conveyor 244. When the first conveyor portion 256 is caused to fold up into a transportation position, as shown in FIG. 4, the deflector plate 292 will pivot to a position substantially parallel to the extension arms and support sleeves so as to maximize clearance when loading the machine onto a trailer or into a storage location.

As shown in FIG. 4, a tow hook 298 is provided on a rear surface of vehicle body frame 262. Tow hook 298 may be used to tow the assembly 10 during loading or in the event of a breakdown in the self-propelled tracked vehicle 28. Alternatively, tow hook 298 may be used to tow a trailer therebehind in order to collect the rough portions of the spoil which are directed behind the assembly 10 by roughs chute 220.

Figure 12:
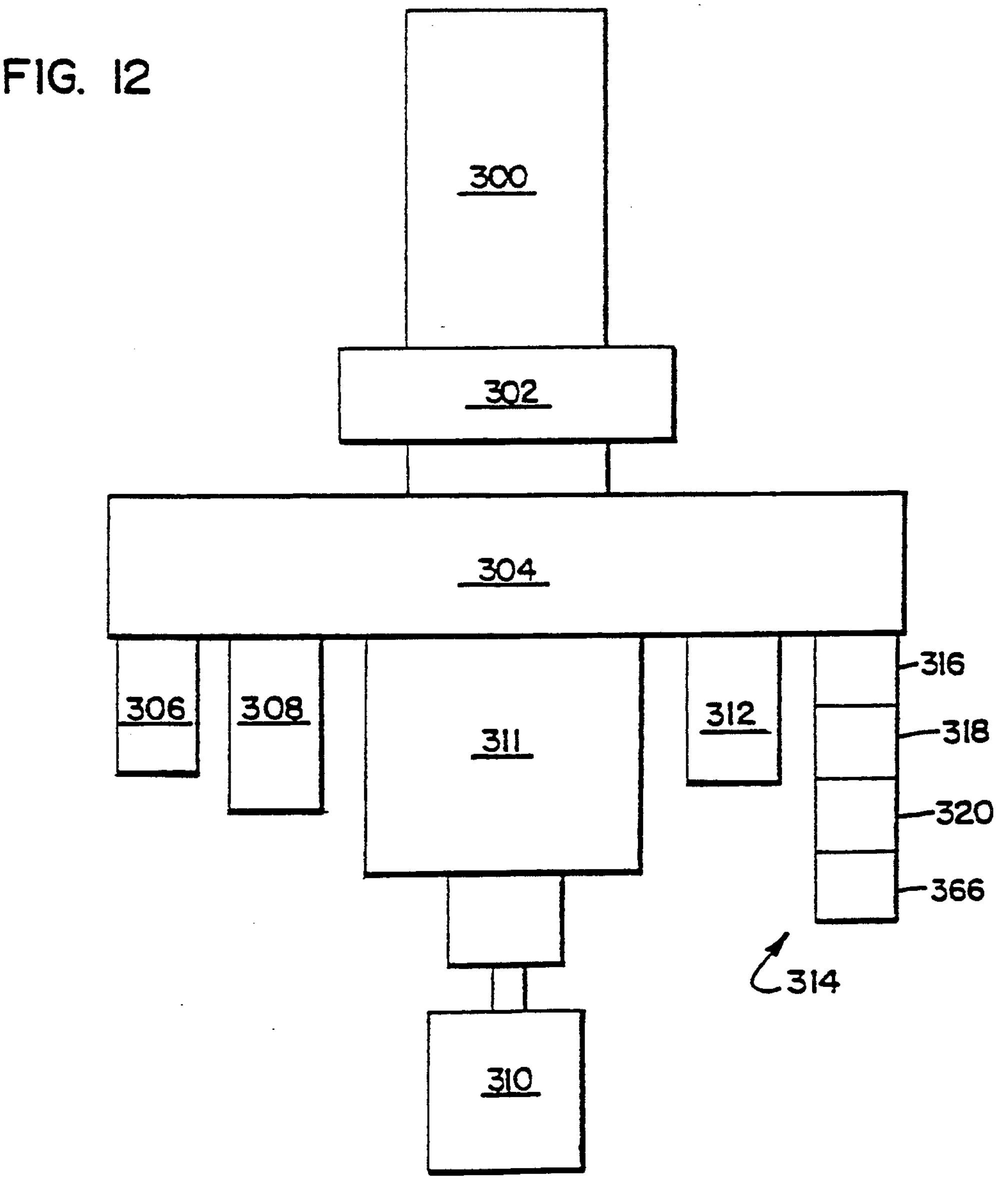
FIG. 12 is a schematic depiction of the mechanical hydraulic pump drive used in the embodiment of FIG. 1.

The control system for operating the various elements of the pipeline padding assembly 10 will now be described. FIG. 12 is a schematic depiction of a mechanical drive train for the various mechanical pumps used in the preferred embodiment of the invention. As shown in FIG. 12, a diesel engine 300 is adapted to power a master pump drive transmission 304 via a master clutch 302 which is controlled by clutch pedal 146 at the control panel 148. Thus, an operator can disengage all of the hydraulic pumps at a given time merely be depressing the master clutch pedal 146.

Master pump drive 304 is mechanically connected to an elevator drive hydraulic pump 306, a left track drive hydraulic pump 308, and a right track drive hydraulic pump 312. Master pump drive 304 is further connected to a conveyor drive hydraulic pump 310 via a two-speed transmission 311 which is shiftable between a high-speed mode and low-speed mode responsive to the high-low switch 172 on control panel 148. The shifting of transmission 311 between the high-speed and low-speed modes is effected via a solenoid-type arrangement in a manner that is known in the mechanical arts.

Also adapted to be driven by master pump drive 304 is a stacked hydraulic pump assembly 314 including a hydraulic pump 316 for driving the shaft 222 and eccentric weights 224 in separator assembly 18, a hydraulic pump 318 for driving the hydraulic motor 58 for the right auger assembly, a hydraulic pump 320 for driving the hydraulic motor in the left auger assembly, and a combined function pump 366 which provides pressure for operating the conveyor tilt mechanism, the separator lift mechanism, the elevator lift mechanism and the mechanism for laterally shifting the conveyor, all of which will be described in detail below.

Figure 11A:
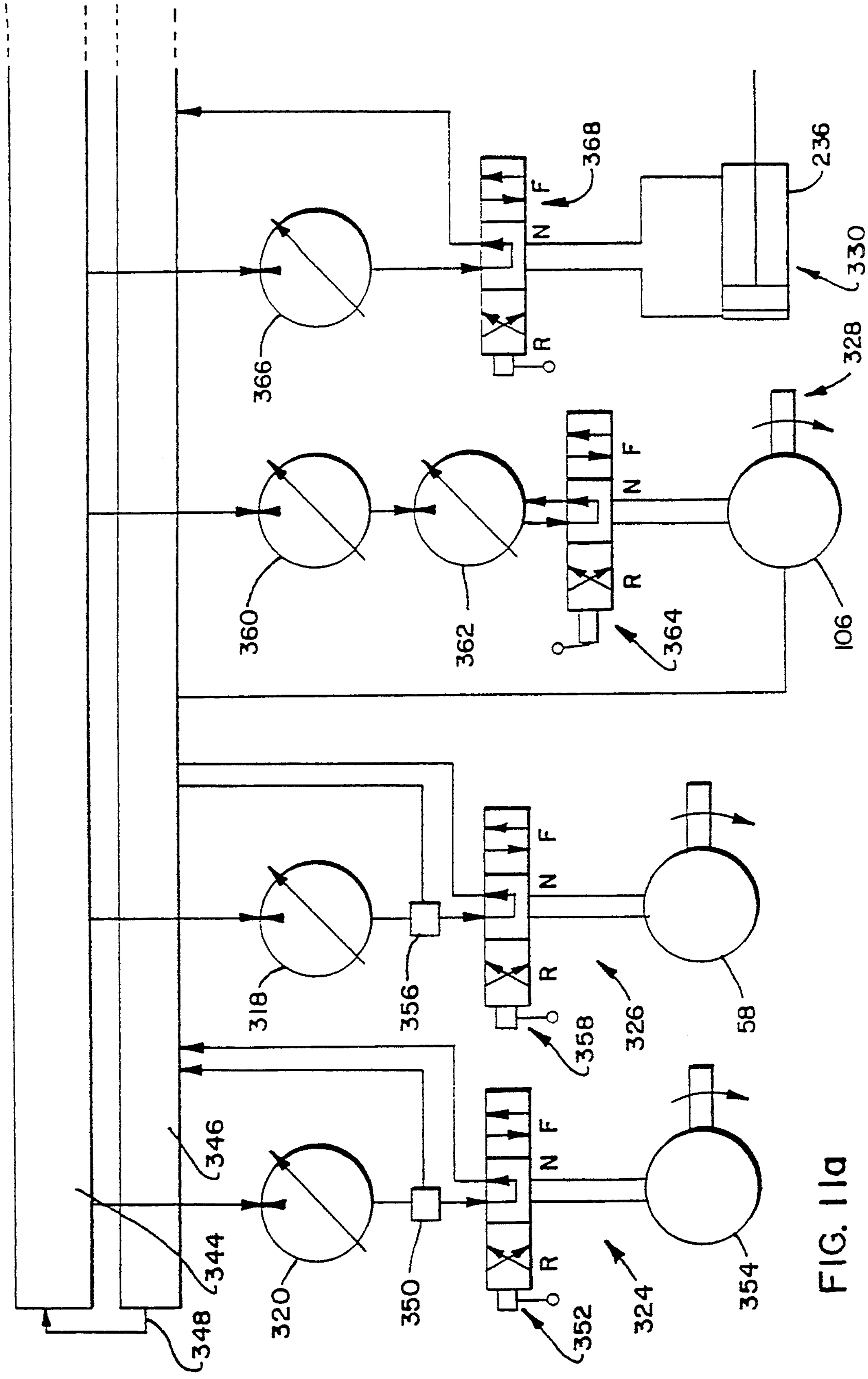
FIGS. 11*a*–11*c* are a schematic depiction of the control system used in the embodiment of FIG. 1.

Referring now to FIGS. **11*a*–11*c*, the hydraulic control system for assembly 10 includes a central hydraulic oil storage tank 344 and a hydraulic oil cooler 346 which returns oil to tank 344 via a tank return line 348. Referring first to FIG. 11*a*, a control circuit 324 is provided for controlling the left auger assembly. In circuit 324, hydraulic pump 320 supplies hydraulic oil to rotate the left auger hydraulic motor 354 in the reverse direction when left auger control valve 352 is in the "R" position. When valve 352 is in the "N" position, pump 320 simply draws hydraulic oil from tank 344 and returns it to oil cooler 346. When valve 352 is in the "F" position, pump 320 supplies hydraulic oil from tank 344 to left auger motor 354 in a direction opposite from that supplied when valve 352 was in the "R" position, thereby driving left auger motor 58, which is represented in FIG. 11*a* as left motor 354, in a forward rotary direction. As is shown in FIG. 11*a*, a pressure relief valve 350 is interposed between left auger pump 320 and control valve 352. Should an excessive level of pressure build up in the supply lines to motor 354, as may occur when a rock is caught in the auger, pressure relief valve 350 will allow hydraulic oil to return to tank 344 via the hydraulic oil cooler 346. Control valve 352 is of the variable capacity type so that an operator can control the speed as well as the direction of the motor 354**.

The right auger control circuit 326 operates in a similar manner. When right auger variable capacity control valve 356 is in the "R" or "F" position, hydraulic oil is supplied to right auger motor 58 by the right auger hydraulic supply pump 318 from the tank 344 in order to drive motor 58 in the desired direction. When right auger control valve 356 is in the "N" position, oil is simply recirculated back into tank 344 through the hydraulic oil core 346. Should excessive pressure build up within the circuit, pressure relief valve 358 allows oil to escape back into hydraulic oil core 346. The right auger control valve 356 is operated via a linkage from switch 166 on control panel 148, and left auger control valve 352 is likewise operated via a linkage by switch 164 on the control panel 148.

A hydraulic elevator control circuit 328 includes a hydraulic pump 362 which is arranged in a closed relationship relative to an elevator drive motor 106 via an elevator control valve 364 which is shiftable between an "R" position in which hydraulic oil is delivered to motor 106 in a first direction, an "N" position in which hydraulic oil is merely circulated within pump 362 and an "F" position in which hydraulic oil is supplied to motor 106 in a second direction opposite the first direction. As shown in FIG. **11*a*, motor 106 is provided with a case drain which dumps into hydraulic oil core 346. In order to replenish the oil in circuit 328 which is lost through the case drain, a charge pump 360 is provided for drawing oil out of tank 344 and supplying the oil to the hydraulic pump 362. The elevator control valve 364 is of the variable capacity type, which allows an operator to control not only the direction of motor 106 but also its speed. Control valve 364 is operated via lever 198 on the control panel 148**.

As is shown in FIG. 11*a*, a separator lift control circuit 330 includes the combined function pump 366 which supplies hydraulic fluid to a pair of lift cylinders 236, which are represented by a single cylinder in FIG. 11*a* for schematic purposes only. A shaker lift control valve 368 is interposed between the combined function pump 366 and cylinders 236, and is shiftable via a linkage controlled by lever 184 on control panel 148 between position "R", position "N" and position "F". When in position "R", cylinders 236 are caused to contract. When in position "F", cylinders 236 are caused to expand. When in position "N", the cylinders 236 remain locked in whatever position they might have been in when valve 368 was shifted to the "N" position. It is not essential that valve 368 be of the variable capacity type, but it may be so designed for the convenience of the operator.

Figure 11B:
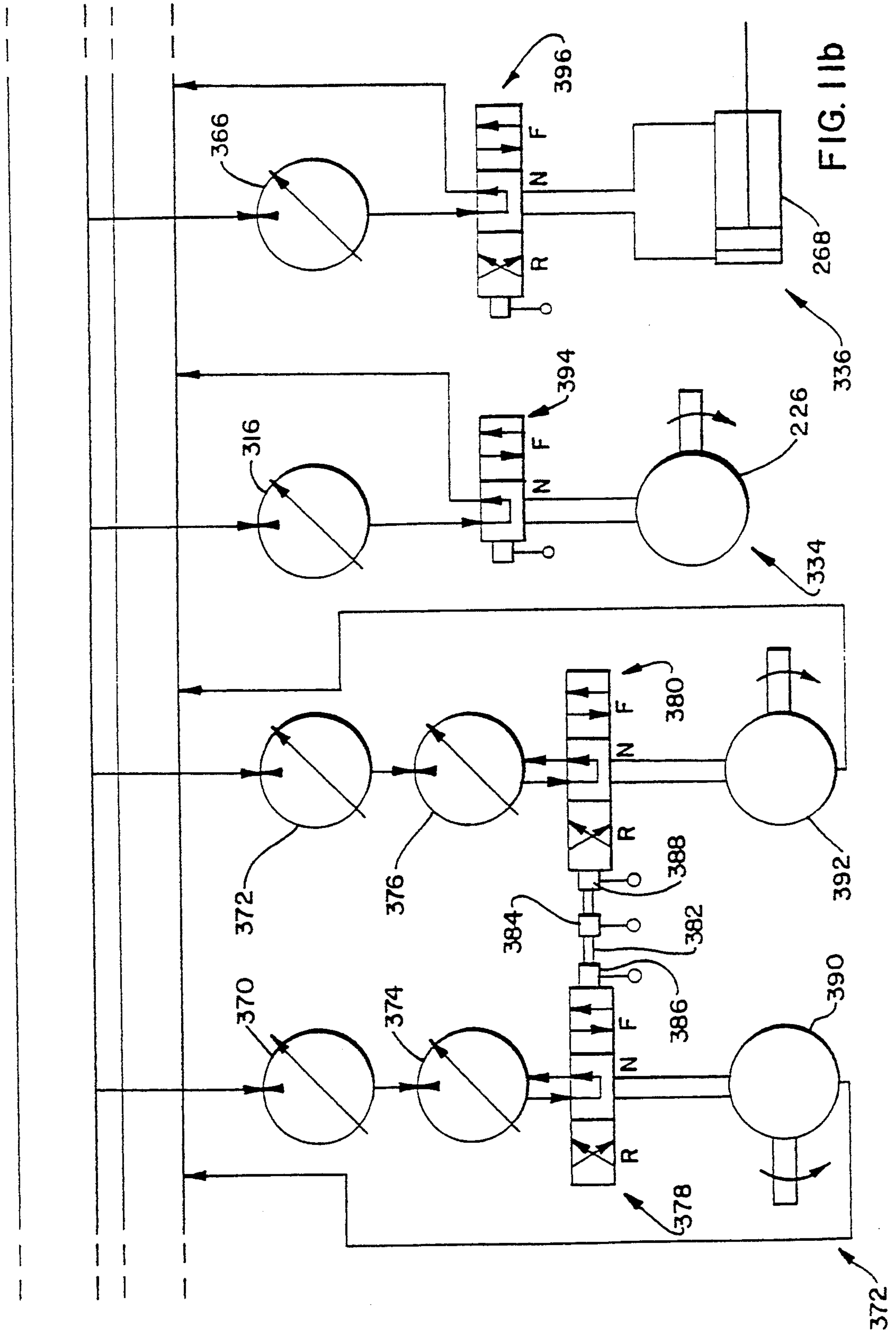

Referring now to FIG. 11*b*, a track drive control circuit 332 includes a left track hydraulic pump 374 which is arranged in close relationship relative to a left track drive motor 390 via a left control valve 378, and a right track pump 376 which is similarly arranged in close relationship with a right track hydraulic drive motor 392 via a right control valve 380. Both the left and right control valves 378, 380 are shiftable between "R", "N" and "F" positions, and are joined together via a linkage 382. A master track control actuator 384 is provided for shifting linkage 382 so that the left and right control valves 378, 380 act in concert. Master track control actuator 384 operates in response to the position of the master control lever 192 which is provided on control panel 148. Both the left and right control valves 378, 380 are of the variable capacity type, which allows the operator to control the speed of motors 390, 392 as well as their direction with the single master control lever 192. A left track adjustment actuator 386 is connected between linkage 382 and left control valve 378. Similarly, a right track adjustment actuator 388 is connected between the linkage 382 and right control valve 380. Left track adjustment actuator 386 is controlled via a linkage by the left side track travel adjustment lever 194 on control panel 148. Likewise, the right track adjustment actuator 388 is controlled via a similar linkage by the right side track travel adjustment lever 196.

When adjustment actuators 386, 388 are in a neutral position, corresponding to the position of levers 194, 196 as shown in FIG. 7, the left and right control valves 378, 380 are aligned so that the left and right track drive motors 390, 392 operate in concert responsive to the position of the master control lever 192 on control panel 148. For example, if lever 192 is in the position indicated in FIG. 7, both control valves 378, 380 are in the "N" position, and neither of the motors 390, 392 are being driven. If control lever 192 is pushed upwardly, both control valves 378, 380 slide to the "F" position and motors 390, 392 are driven in a forward direction at the same speed. Since the valves 378, 380 are of the variable capacity type, the forward speed of motors 390, 392 depends on how far the operator chooses to push lever 192 in the upward direction. If the operator pulls lever 192 downwardly, both valves 378, 380 slide to the "R" position, thereby driving both track drive motors 390, 392 in reverse.

When it is desired to move track motors 390, 392 at different speeds, such as is necessary when turning the assembly 10, levers 194 and 196 are used to vary the relative positions of the left and right control valves 378, 380. In this way, a slight deviation in the speed of the tracks may be compensated for by shifting one of the levers 194, 196 a slight amount. By shifting one of the levers 194, 196 all the way up or all the way down, one of the motors 390, 392 may be driven in a direction opposite from the other, which results in sharp turning of the assembly. As a result, levers 192, 194 and 196 may be used to conveniently control the locomotion of assembly 10.

As is shown in FIG. 11*b*, each of the left and right track drive motors 390, 392 are provided with case drains which lead back to oil cooler 346. In order to compensate for oil lost through the case drains, a left charge pump 370 is provided for charging left track pump 374 with oil, and a right charge pump 372 is provided for similarly charging right track pump 376 with oil.

In order to drive the shaker portion of separator assembly 18, a shaker drive circuit 334 includes a hydraulic pump 316 which draws oil out of tank 344 and supplies it to a shaker motor 226 via a two-way valve 394. Shaker control valve 394 is shiftable between an "N" position and an "F" position. In the "N" position, oil is merely recirculated back into tank 344 via the hydraulic oil cooler 346. When in the "F" position, valve 394 supplies oil to motor 226 in order to drive the shaft 222 and eccentric weight 224, as is described above. Shaker control valve 394 operates in response to the position of lever 180 on control panel 148 and is of the variable capacity type, so the operator can control the speed of rotation of the shaker motor 226.

A conveyor lift circuit 336 includes a conveyor piston cylinder unit 268 that is connected to the combined function pump 366 via a control valve 396, which is shiftable between an "R" position, "N" position and "F" position. When valve 396 is the "R" position, cylinder 268 will be retracted. When valve 396 is in the "F" position, cylinder 268 will be extended. When valve 396 is moved to the "N" position, cylinder 268 will be frozen in whatever position it might have been in at the time. Valve 396 may be of the variable displacement type for the convenience of the operator, and is driven via a linkage by lever 188 on control panel 148.

Figure 11C:
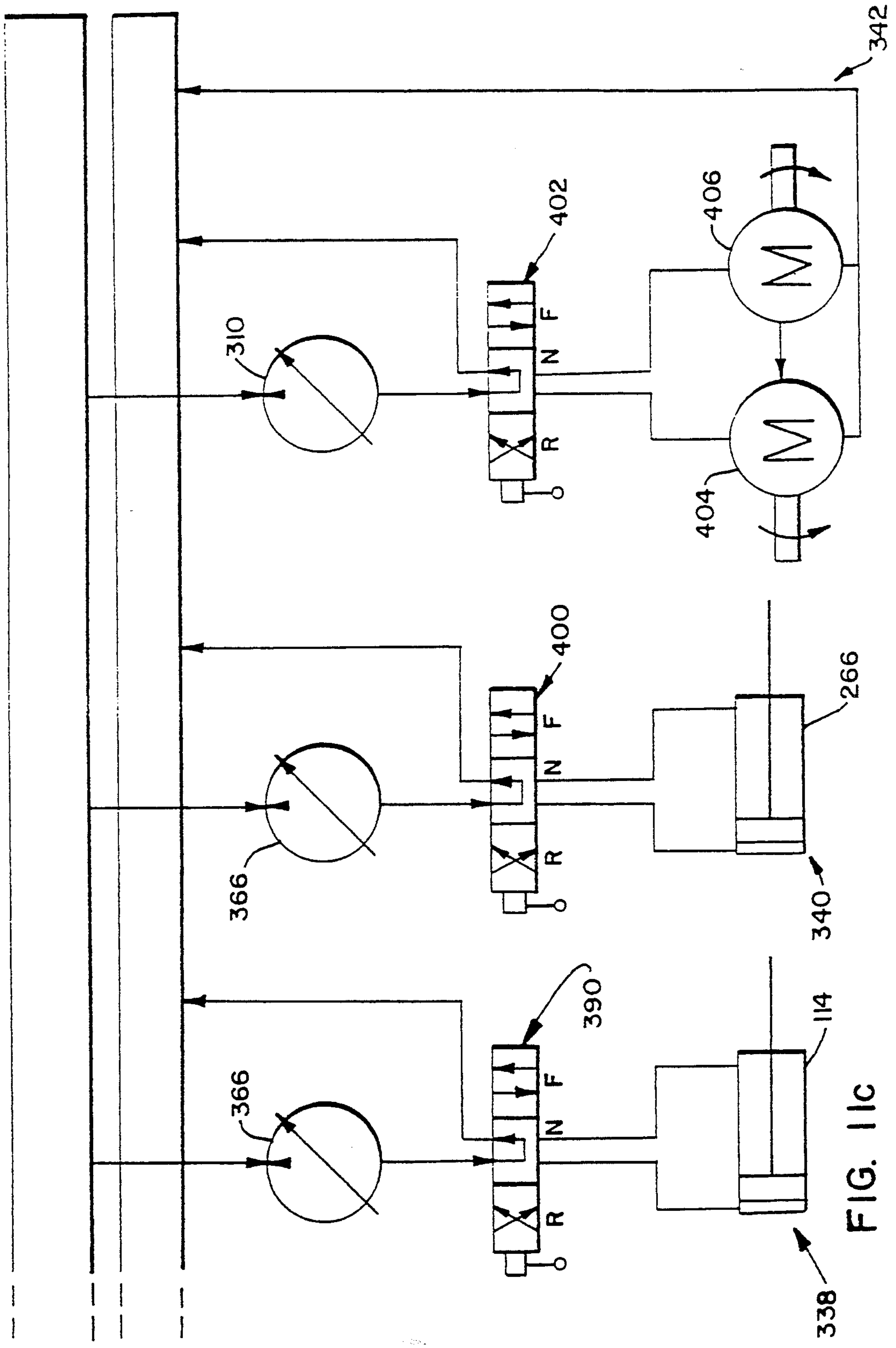
Figure 14:
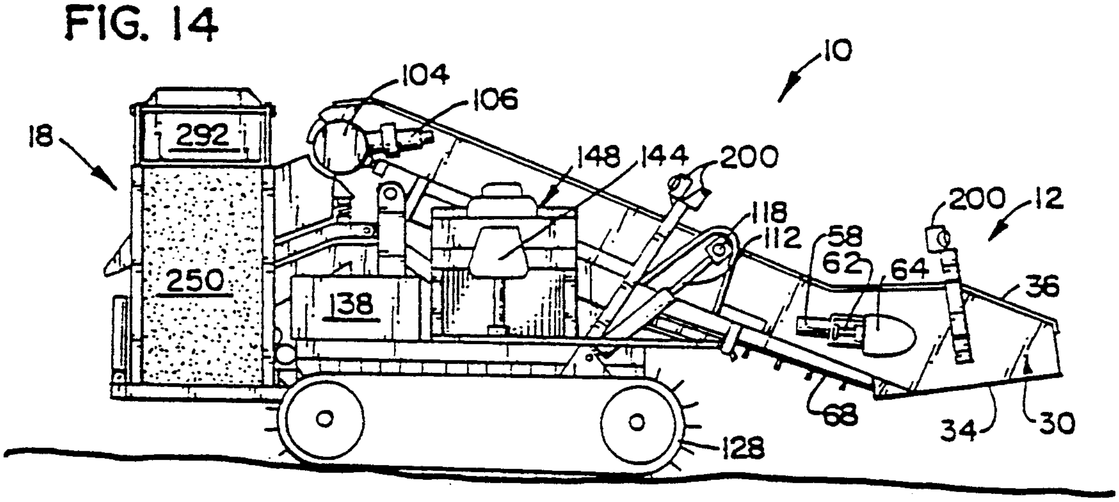
FIG. 14 is a diagrammatical view illustrating the operation of an assembly according to the embodiment of FIG. 1 in a second position.

Referring now to FIG. 11*c*, an elevator lift circuit 338 includes a pair of elevator lift cylinders 114 which are connected to combined function pump 366 via an elevator lift control valve 398 which is positionable responsive to lever 190 on control panel 148. When valve 398 is in the "R" position, cylinders 114 are caused to retract. When valve 398 is in the "F" position, cylinders 114 are caused to extend. When valve 398 is shifted to the "N" position, cylinders 114 are frozen in whatever position they might have been in at that time.

A circuit 340 for laterally shifting the conveyor includes a conveyor shift cylinder 266 which is connected to the combined function pump 366 via a conveyor shift valve 400 which operates in response to the position of control lever 186 on the control panel 148. When in the "R" position, cylinders 266 contract; they expand when in the "F" position. The "N" position freezes cylinders 266 in whatever position they might have been in at the time.

A conveyor motor drive circuit 342 includes a first conveyor motor 404 and a second conveyor motor 406 which is connected in series with motor 404 so that both operate in concert in response to hydraulic fluid supplied by a conveyor drive hydraulic pump 310. Interposed between pump 310 and the motors 404,406 is conveyor control valve 402 which operates in response to control lever 182 on the control panel 148. Control valve 402 is of the variable capacity type, so that the speed as well as the direction of motors 404, 406 may be controlled by the operator. A case drain is provided to convey oil leakage within the motors 404, 406 back to the hydraulic oil tank 344 via oil cooler 346. As was previously discussed, first and second conveyor motors 404, 406 are positioned within the first drive drum 246 and second drive drum 248.

Figure 13:
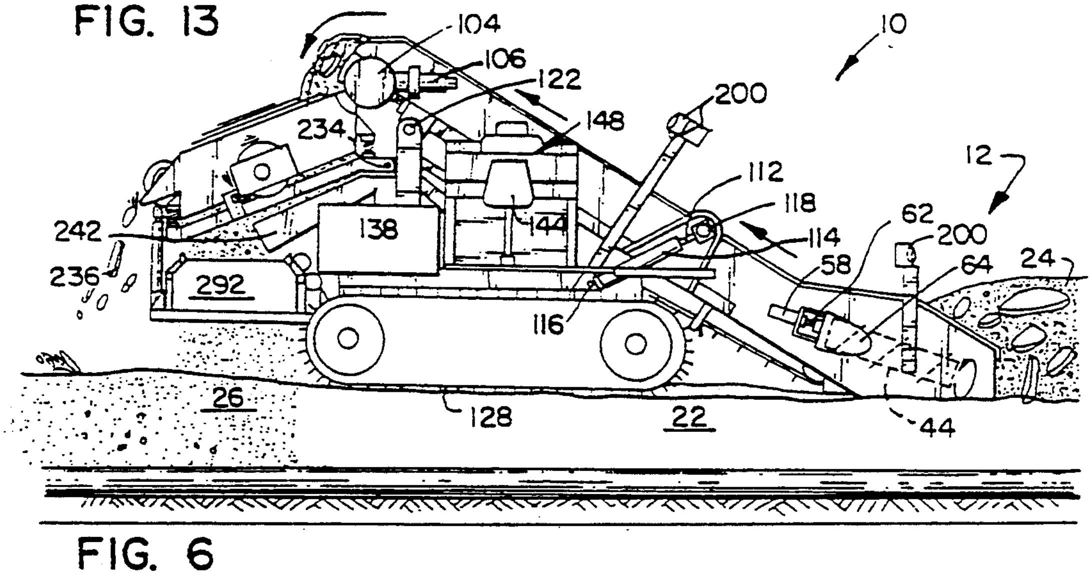
FIG. 13 is a diagrammatic view illustrating the operation of an assembly according to the embodiment of FIG. 1 in a first position.

The various modes of operation of a pipeline padding assembly constructed according to the preferred embodiment of the invention will now be discussed. Referring to FIG. 13, the pipeline padding assembly 10 is shown operating on a pile of spoil on relatively level ground. In this mode of operation, both the elevator lift assembly 110 and the separator lift piston-cylinders 236 are in an intermediate position so that the lower surfaces 34 of the guide projections 30, 32 are in contact with the underlying ground surface, and the separator assembly is inclined at the proper degree to allow only the rough portion of the spoil to fall off the rear end thereof.

Figure 15:
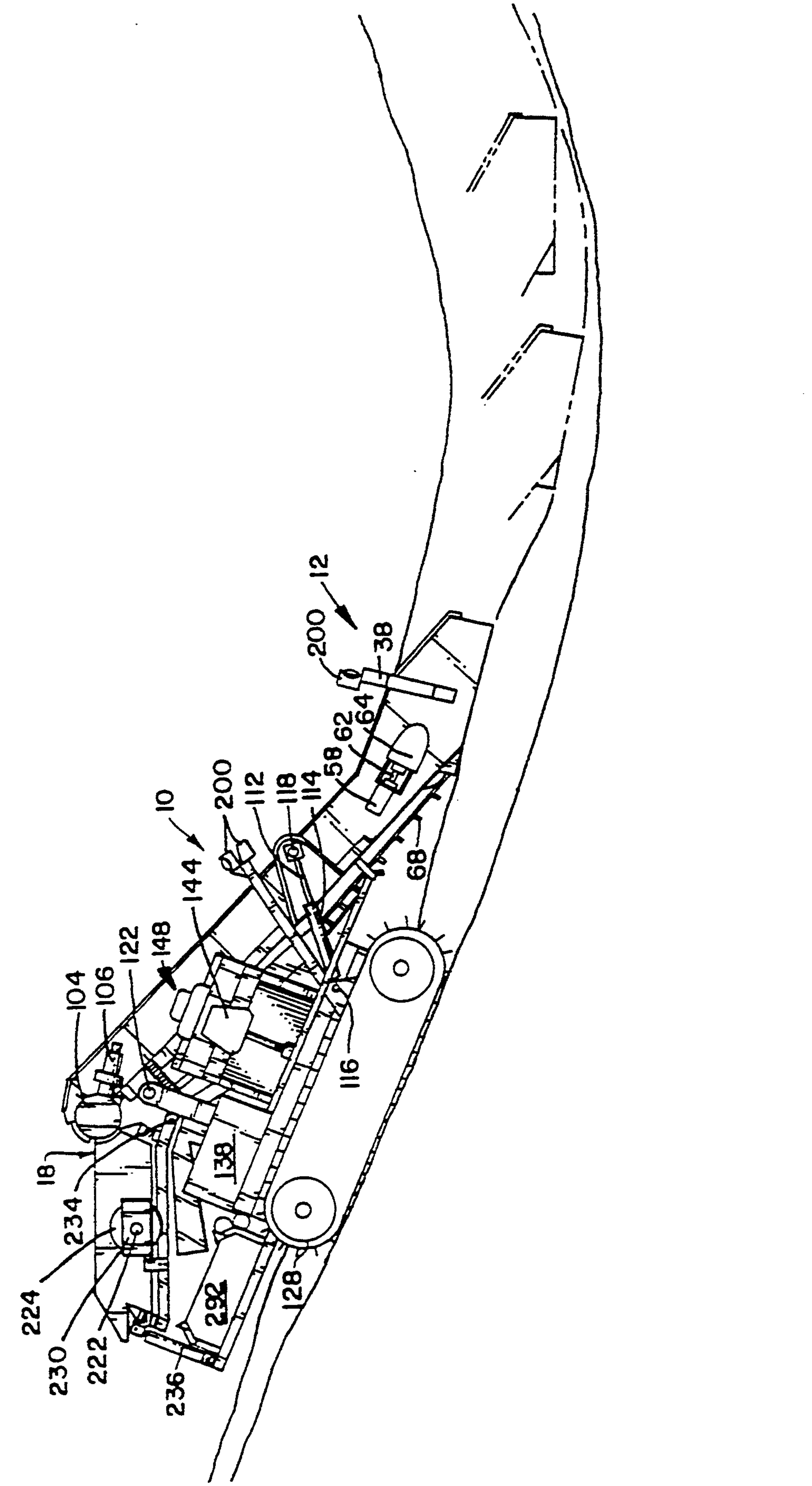
FIG. 15 is a diagrammatical view illustrating the operation of an assembly according to the embodiment of FIG. 1 in a third position.

FIG. 15 illustrates the assembly 10 in a second operating position, wherein the pipeline padding assembly 10 is entering a sharply inclined ditch or hollow. In this instance, the elevator assembly 16 is caused to pivot to an upward position, so that underlying soil is not scraped into the elevator along with the spoil. In addition, the separator piston-cylinder lift assembly is contracted so as to maintain the separator at its proper inclination.

Figure 16:
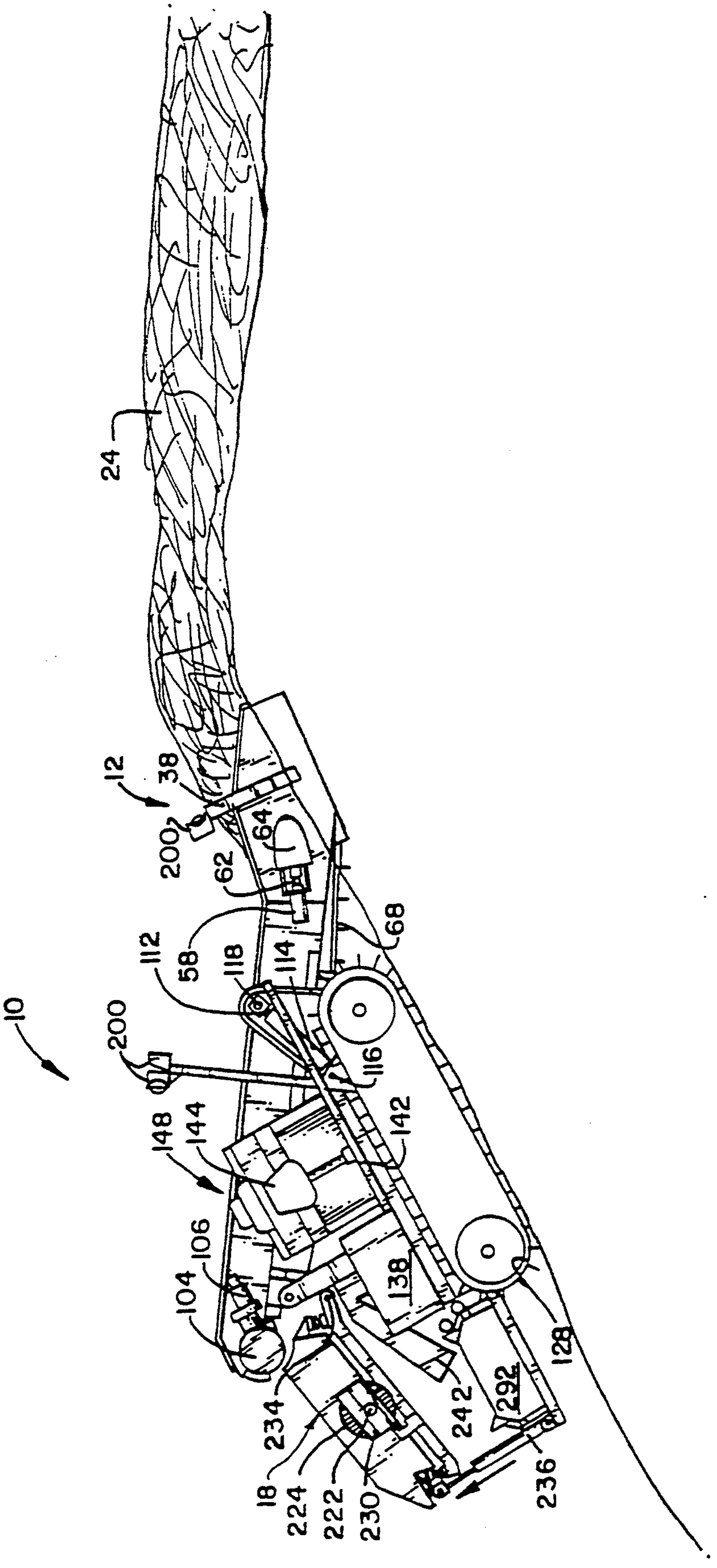
FIG. 16 is a diagrammatical view illustrating operation of an assembly constructed according to the embodiment of FIG. 1 in a fourth position.

FIG. 16 illustrates the pipeline padding assembly 10 in a third operating mode, in which the assembly is coming to the top of a steep incline. In this position, the separator lift piston-cylinder assembly is extended so as to maintain the separator at its proper inclination. In addition, the elevator assembly 16 is pivoted to a lower position so as to keep the lower surfaces 34 of guide projections 30, 32 at a constant distance below the underlying surface, whereby as much spoil as possible will be scooped into the elevator assembly 16. As shown in FIGS. 15 and 16, the assembly 10 can be used to collect in situ spoil below the ground surface or can be used to collect spoil excavated from the pipeline trough.

2. The Embodiment of FIGS. 17 and 18

Figure 17:
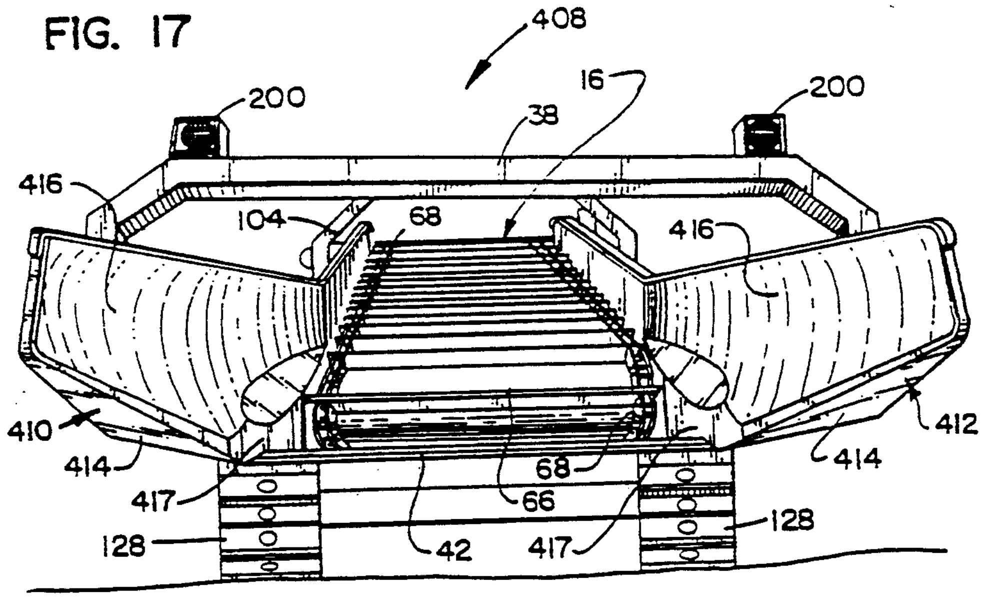
FIG. 17 illustrates an alternative embodiment of one feature of the invention.
Figure 18:
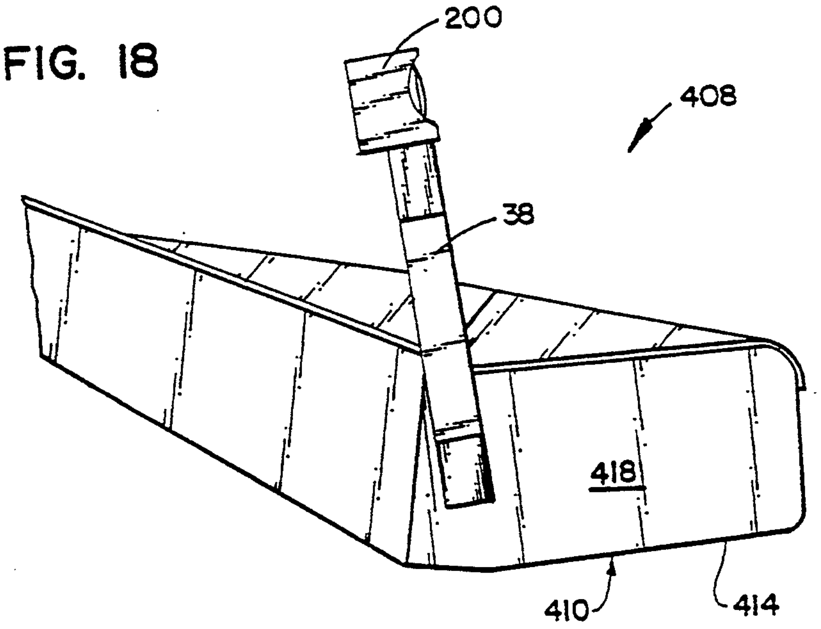
FIG. 18 is a side elevational view of the alternative embodiment illustrated in FIG. 17.

Referring now to FIGS. 17 and 18, a second embodiment 408 of the spoil guide assembly will now be discussed. In the embodiment of FIGS. 17 and 18, no augers are provided to direct spoil onto the elevator assembly 16. Rather, first and second guide projections 410, 412 are provided which flare outwardly to a wide degree and have slightly concave inner guide surfaces 416 for directing the spoil laterally inward toward elevator assembly 16. As shown guide projections 410 and 412 form an open bottomed structure for the spoil. First and second guide projections 410, 412 are each provided with a lower ground engaging surface 414, as is shown in FIG. 17, and have outer surfaces 418 which are similar to those in the embodiment of FIGS. 1–16. A lower guide surface 417 is also provided in the inner portions of each of the guide projections 410, 416. The lower guide surfaces 417 are instrumental in guiding spoil thereto.

It has been found that a guide assembly constructed according to the embodiment of FIGS. 17 and 18 is most effective when padding pipeline in especially rocky soil, which tends jam the auger assemblies in a device according to FIGS. 1–16. However, the embodiment illustrated in FIGS. 1–16 may have greater utility for use with soil having fewer rocks.

3. The Embodiment of FIG. 19

Figure 19:
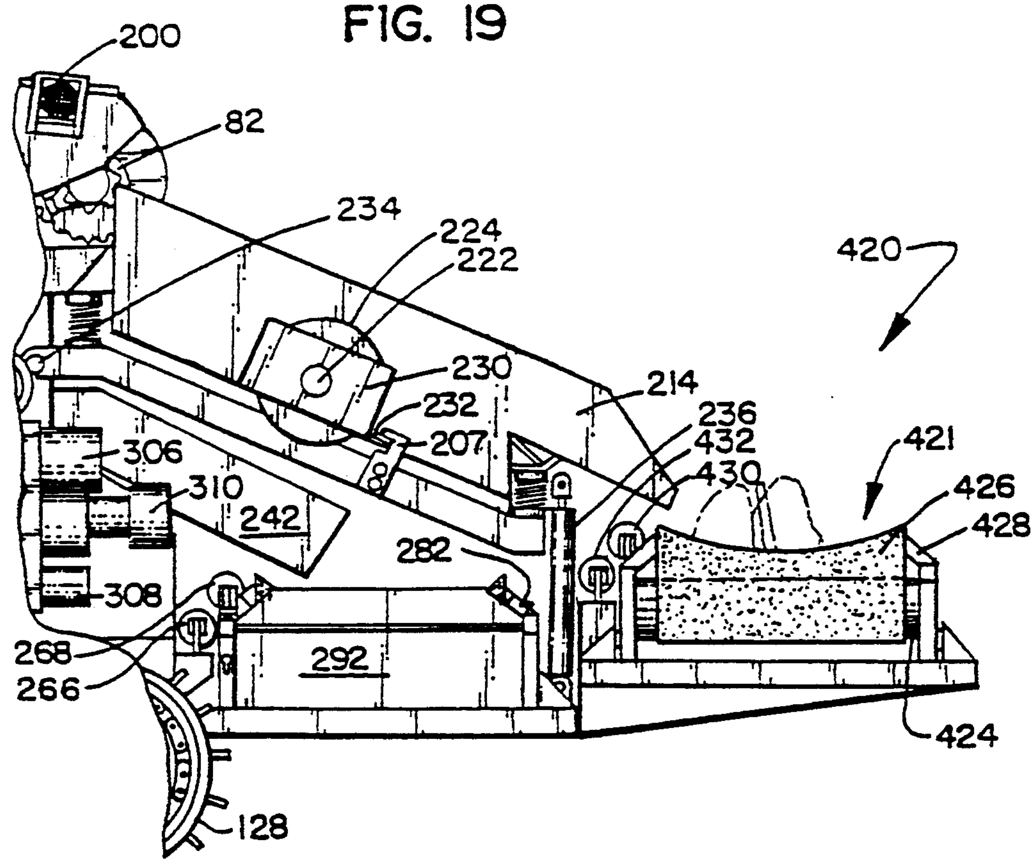
FIG. 19 illustrates an alternative embodiment of a second feature of the invention.

Referring now to FIG. 19, an additional alternative embodiment 420 is disclosed wherein a second conveyor assembly 421 is provided for guiding the rough portions of the spoil which spill off the roughs chute into a nearby vehicle, such as a dump truck, or to the side of the padding assembly away from the excavation having the pipeline therein. Second conveyor assembly 421 is constructed similarly to conveyor assembly 20 in that it is both laterally shiftable via a piston-cylinder arrangement 432 and has first and second portions which tilt relative to each other for storage responsive to a tilt piston-cylinder assembly 430. A number of roller guide brackets 428 are provided for supporting a number of belt guide rollers beneath an endless conveyor belt 426, as in the conveyor assembly 20. A pair of drive drums 424 are provided for driving endless conveyor belt 426. The slide piston-cylinder assembly 432, the tilt piston-cylinder assembly 430 and the hydraulic motors for turning drums 424 would all be controlled via the control circuit by additional circuits identical to those used to control the corresponding components of conveyor assembly 20. In this way, the large rocks and other rough portions of the spoil could be collected to be used as fill or masonry or for other applications.

4. The Embodiment of FIGS. 20–27

Referring now to FIGS. 20–27, an apparatus 502 for padding a pipeline which is constructed according to a fourth embodiment of the invention includes a modified tracked support vehicle 504. As may be seen in FIG. 20, support vehicle 504 has mounted thereon an elevator section 506, a spoil guiding section 508, a separator section 510 and a conveyor section 512. Support vehicle 504 is constructed identically to the vehicle disclosed above in reference to the embodiment of FIGS. 1–16, except for the placement of its engine section 514, which will be discussed in greater detail below. Elevator section 506 is identical in construction to elevator assembly 16 except for the differences which are specifically disclosed below. Likewise, separator section 510 is identical to the separator assembly 18 disclosed hereinabove, except for the modifications which are specifically disclosed below. Conveyor section 512 is identical in all respects to the conveyor assembly 20.

Figure 20:
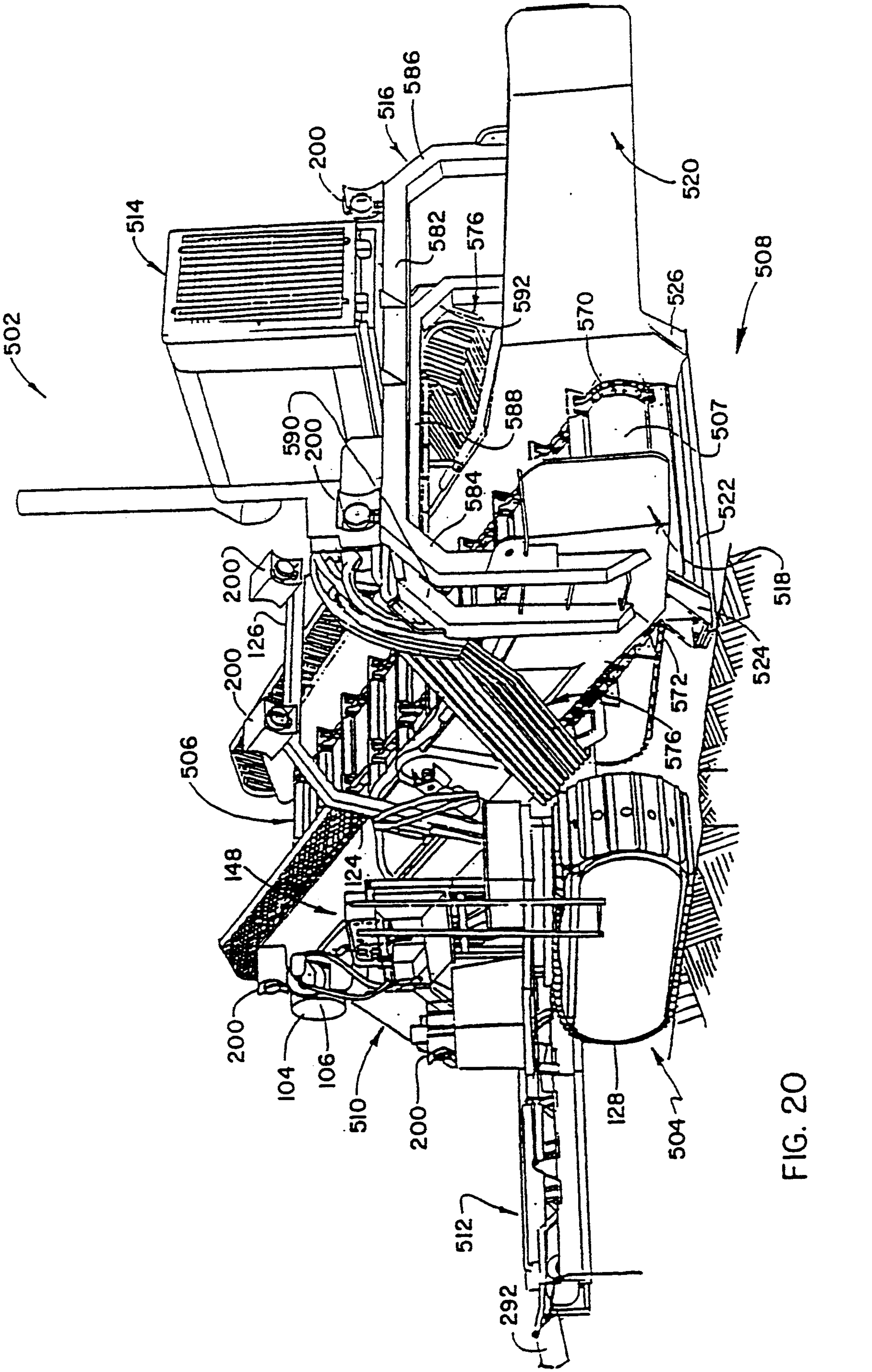
FIG. 20 is a perspective view of a pipeline padding assembly constructed according to a fourth embodiment of the invention.

As may be seen in FIG. 20, one salient feature of pipeline padding apparatus 502 is that the engine section 514 of support vehicle 504 is positioned by support structure 516 in a location which is elevated with respect to and forward of a front end 507 of the elevator section 506. Due to its location, engine section 514 applies a downward force to the spoil guiding section 508 during operation, which tends to stabilize guiding section 508 relative to the spoil. By placing engine section 514 above and forward of elevator section 506, the amount of dust and dirt that the engine section 514 will be exposed to during operation of the apparatus 502 has been greatly reduced. Other benefits which are gained by the placement of engine section 514 will be discussed at greater length below.

Figure 21:
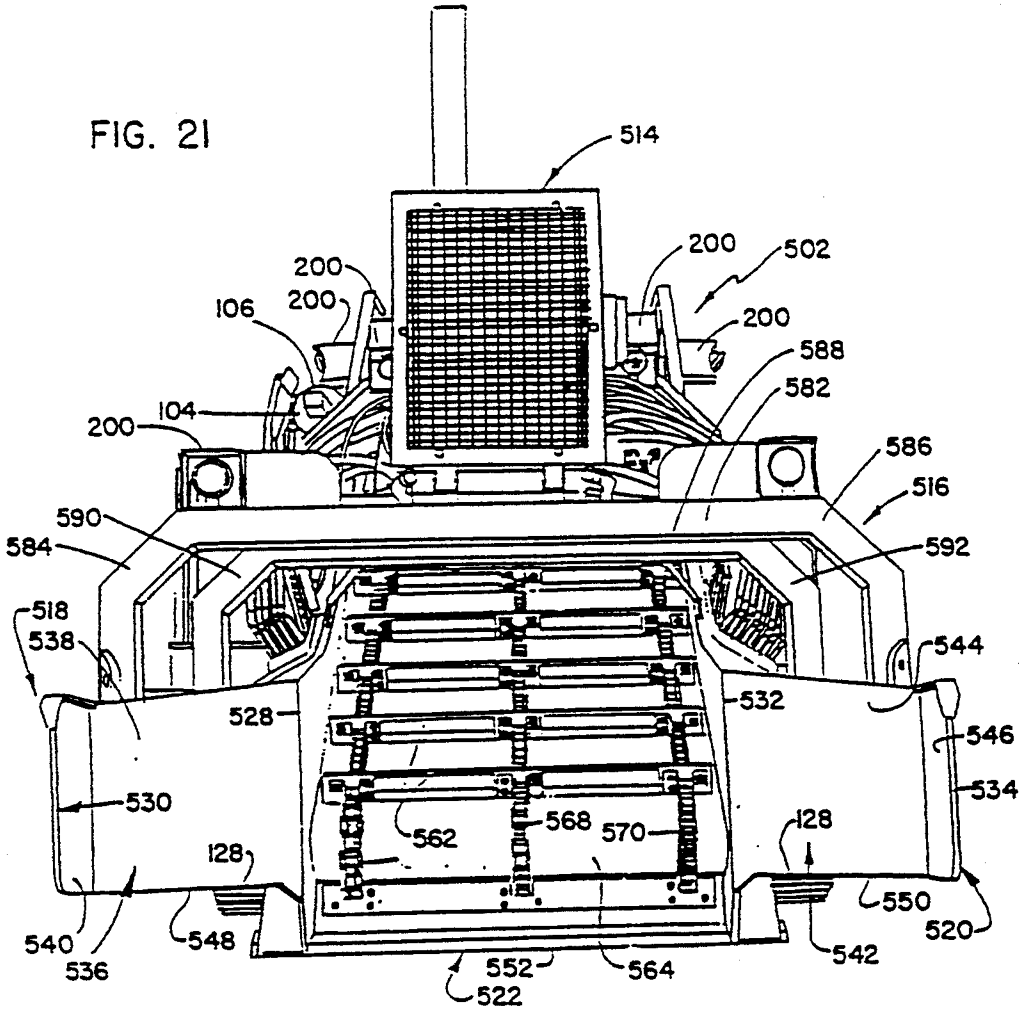
FIG. 21 is a front elevational view of the pipeline padding assembly illustrated in FIG. 20.

Referring now to FIGS. 20 and 21, the structure of spoil guiding section 508 will now be discussed in greater detail. As may be seen in FIG. 20, spoil guiding section 508 includes a first, right side guide member 518 and a second, left side guide member 520. Spoil guiding section 508 also includes a cutter element 522 that is mounted to a forward end 507 of elevator section 506 by a right cutter mount projection 524 and a left cutter mount projection 526. As may be seen in FIGS. 21 and 22, cutter element 522 has a leading edge 552 which is positioned beneath elevator section 506 so as to deflect rocks or like material upwardly toward the elevator section 506 during operation. In this way, large rocks or other articles of this nature are less likely to pass between the bottom end of elevator section 506 and the ground. Such objects could otherwise damage the support vehicle 504. Another purpose of cutter element 522 is that it stabilizes the elevator section 506 relative to the spoil during operation, through a spoiler-type effect. As may be seen in FIG. 20, cutter element 522 is positioned downwardly and rearwardly with respect to guide members 518, 520.

Looking now to FIG. 21, the first guide member 518 has a first end 528 which is unitary with the forward end 507 of elevator section 506, and a second end 530 which constitutes a forward leading edge of guide member 518. Likewise, second guide member 520 has a first end 532 which is unitary with the forward end 507 of elevator section 506, and a second end 534 which constitutes a forward leading edge of second guide member 520. First guide member 518 has an inner guide surface 536 defined thereon which includes a first guide surface portion 538 and a second guide surface 540. As may be best seen in FIG. 24, first guide surface portion 538 is contained within a plane which is angled forwardly and outwardly with respect to a vertical plane containing a central axis 545 of the elevator section 506. Likewise, second guide member 520 has an inner guide surface 542 defined thereon which includes a first guide surface portion 544 and a second guide surface portion 546. First guide surface portion 544 is positioned within a plane which is angled forwardly and outwardly with respect to the vertical plane which contains axis 545, so that first guide surface 544 directs spoil inwardly toward the central axis 545 when support vehicle 504 moves forward during operation. First and second guide members 518, 520 further both include a respective second guide surface portion 540, 546. Second guide surface portions 540, 546 face opposite to one another, as may be seen in FIG. 24. Both of the second guide surface portions 540, 546 are preferably contained within respective planes which are substantially parallel to the vertical plane which contains the central axis 545 of elevator section 506.

As may perhaps best be seen in FIG. 21, the first and second guide members 518, 520 each include a bottom edge 548, 550, respectively. Bottom edges 548, 550 are positioned above the level of cutter element 522. As a result, bottom edges 548, 550 are usually elevated with respect to the underlying ground surface during operation of the apparatus, since cutter element 522 is usually at or above ground level. This allows excess spoil to pass beneath bottom edges 548, 550 as the support vehicle 504 moves forward. Preferably, the bottom edges 548, 550 are substantially continuous and flat from first ends 528, 532 to the respective second end 534, 538 of guide members 518, 520, so that the spoil which escapes beneath each of the bottom edges 548, 550 is smoothed out during operation to provide a stable surface upon which support vehicle 504 can ride. As best shown in FIG. 21, the bottom edges 548 and 550 may be the lowermost edge of guide members 518 and 520, or the bottom edges may be part of the planar, bottom surface of the guide members 518 and 520. This aspect of the invention is discussed in greater detail below.

Figure 22:
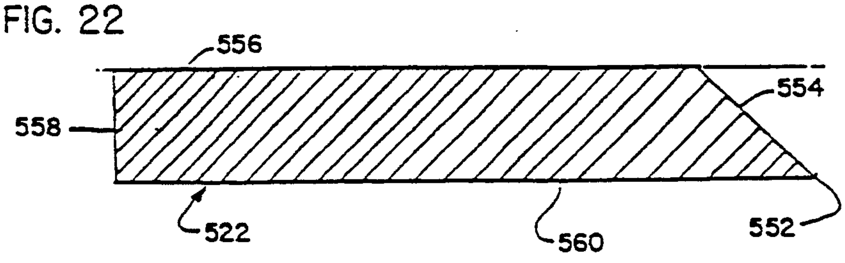
FIG. 22 is a side elevational view of a cutter element which is used in the embodiment of FIGS. 20 and 21.

As is best shown in FIG. 22, cutter element 522 includes a forward leading edge 552 which is formed at an intersection of an inclined forward surface 554 with a flat bottom surface 560. Cutter element 522 further includes a flat top surface 556 and a flat rear surface 558. As may be seen in FIG. 23, the flat bottom surface 560 of cutter element 522 is preferably disposed at a fixed angle $\Theta$ with respect to the bottom edges 548, 550 of guide members 518, 520. Preferably, angle $\Theta$ is within the range of 5 to 25 degrees, and is most preferably about 12 degrees.

Looking again to FIG. 21, elevator section 506 is similar to that disclosed above with reference to the embodiment of FIGS. 1–19 in that it includes a plurality of flat members 562 which are positioned to sweep along a flat elevator floor 564. Flat members 562 are reinforced, and preferably have a heighth of about 6" and a thickness of between ½" to 1". The most preferred thickness is about ⅝". A right drive chain 566, a center drive chain 568 and a left drive chain 570 are provided to move flat members 562 relative to the elevator floor 564, in order to transport spoil upwardly from guiding section 508 toward separator section 510. A benefit of central chain 568 is that it effectively shortens the unsupported length of the flat members 562 between the chains, thus giving flat members 562 greater resistance against bending. This is important, particularly when working in soil that contains a high proportion of large, heavy rocks. In addition, the extra chain 568 prevents clay and other soil from becoming deposited between the flat members 562 and the elevator floor 564 by keeping flat members 562 tightly biased against floor 564.

Figure 24:
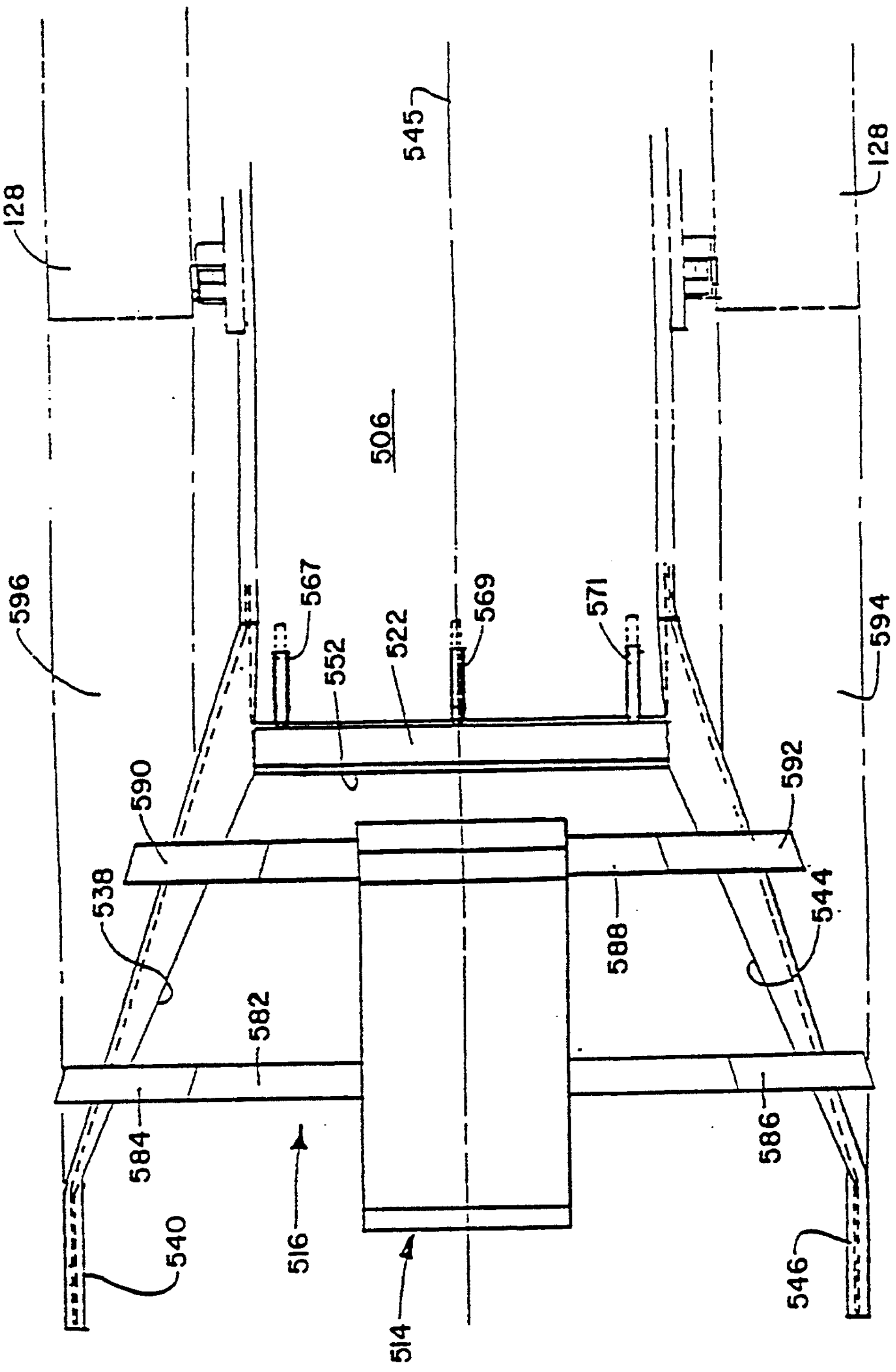
FIG. 24 is a diagrammatical view depicting the operation of a pipeline padding assembly constructed according to the embodiment shown in FIGS. 20–23.
Figure 26:
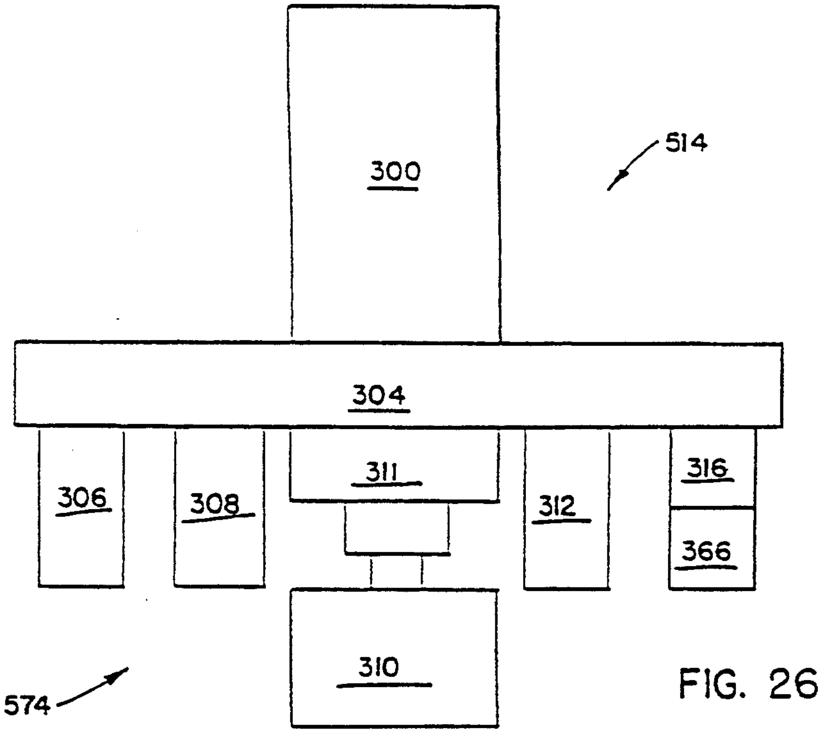
FIG. 26 is a schematic view depicting the engine section of the pipeline padding assembly illustrated in FIGS. 20–25.

As may be seen in FIG. 24, right drive chain 566 is designed to travel about a front right idler 567. Likewise, center chain 568 and left chain 570 are designed to travel around front center and left idlers 569, 571 respectively. Sprockets are provided on the opposite end of elevator section 506, as is disclosed in appropriate detail with reference to the embodiment shown in FIGS. 1–16.

In order to provide access to engine section 514, a number of steps 572 are attached to an outer surface of each of the first and second guide members 518, 520.

Figure 23:
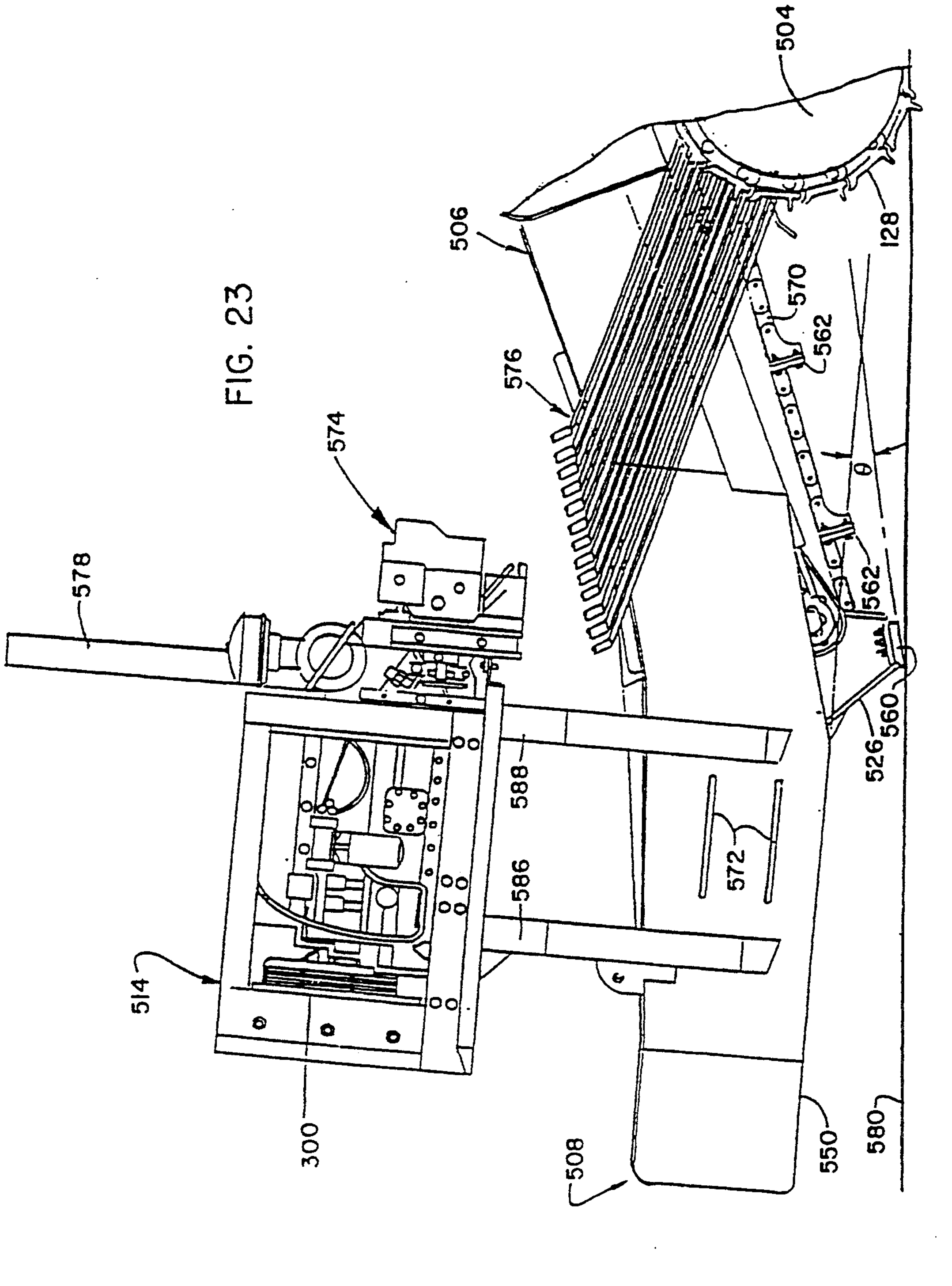
FIG. 23 is a fragmentary opposite side elevational view of the pipeline padding assembly depicted in FIGS. 20–22.

Looking now to FIG. 23, engine section 514 includes a motor 300 that is identical in all respects to the motor 300 which was previously described. An exhaust stack 578 emits exhaust from motor 300 at a position well above engine system 514. Motor 300 is connected via a master pump drive transmission 304 to an assembly 574 of different hydraulic pumps, as is illustrated schematically in FIG. 26. Master pump drive transmission 304 is mechanically connected to an elevator drive hydraulic pump 306, a left track drive hydraulic pump 308, and a right track drive hydraulic pump 312. Master pump drive transmission 304 is further connected to a conveyor drive hydraulic pump 310 via a two speed transmission 311 which is shiftable between a high speed mode and a low speed mode responsive to the high-low switch 172 on control panel 148, which is shown in FIG. 7 of the drawings. The shifting of transmission 311 between the high speed and low speed modes is effected via a solenoid type arrangement in a manner that is known in the mechanical arts.

Also adapted to be driven by master pump drive transmission 304 is a stacked hydraulic pump assembly 577, which includes a hydraulic pump 316 for driving the shaft 222 and eccentric weights 224 in separator section 510, and a combined function pump 366 which provides pressure for operating the conveyor tilt mechanism, the separator lift mechanism, the elevator lift mechanism and the mechanism for laterally shifting the conveyor, all of which are described in detail with reference to the embodiment of FIGS. 1–16.

As may be seen in FIG. 23, each of the hydraulic pumps in hydraulic pump assembly 574 are connected to the respective motors and piston cylinder units through the control panel via hydraulic pressure lines 576. Since hydraulic pressure lines 576 have to reach a relatively longer distance from the new position of engine section 514 to their respective motors and cylinder units, a greater amount of surface area is exposed, which promotes cooling of the hydraulic fluid or oil therein. In order to enhance this cooling effect, hydraulic pressure lines 576 are positioned externally of vehicle 504 to the greatest extent possible. The hydraulic distribution circuit is identical to that described with reference to the embodiment of FIGS. 1–16, except that no auger drive circuits are included. A hydraulic oil tank 344 is positioned on the main portion of vehicle 504. Since oil must travel through a feed line from oil tank 344 to pump assembly 577 in its position above and forward of the elevator section, further cooling is achieved in comparison to previous designs.

Referring now to FIG. 24, the engine support structure 516 includes a first cross beam 582 which is elevated with respect to the first and second guide members 518, 520 by a pair of angle posts 584, 586. A second cross beam 588 is positioned horizontally above the first and second guide members 518, 520 by a second pair of angle posts 590, 592. Engine section 514 rests upon the top surfaces of the first and second cross beams 582, 588, as is best shown in FIG. 23.

Figure 27:
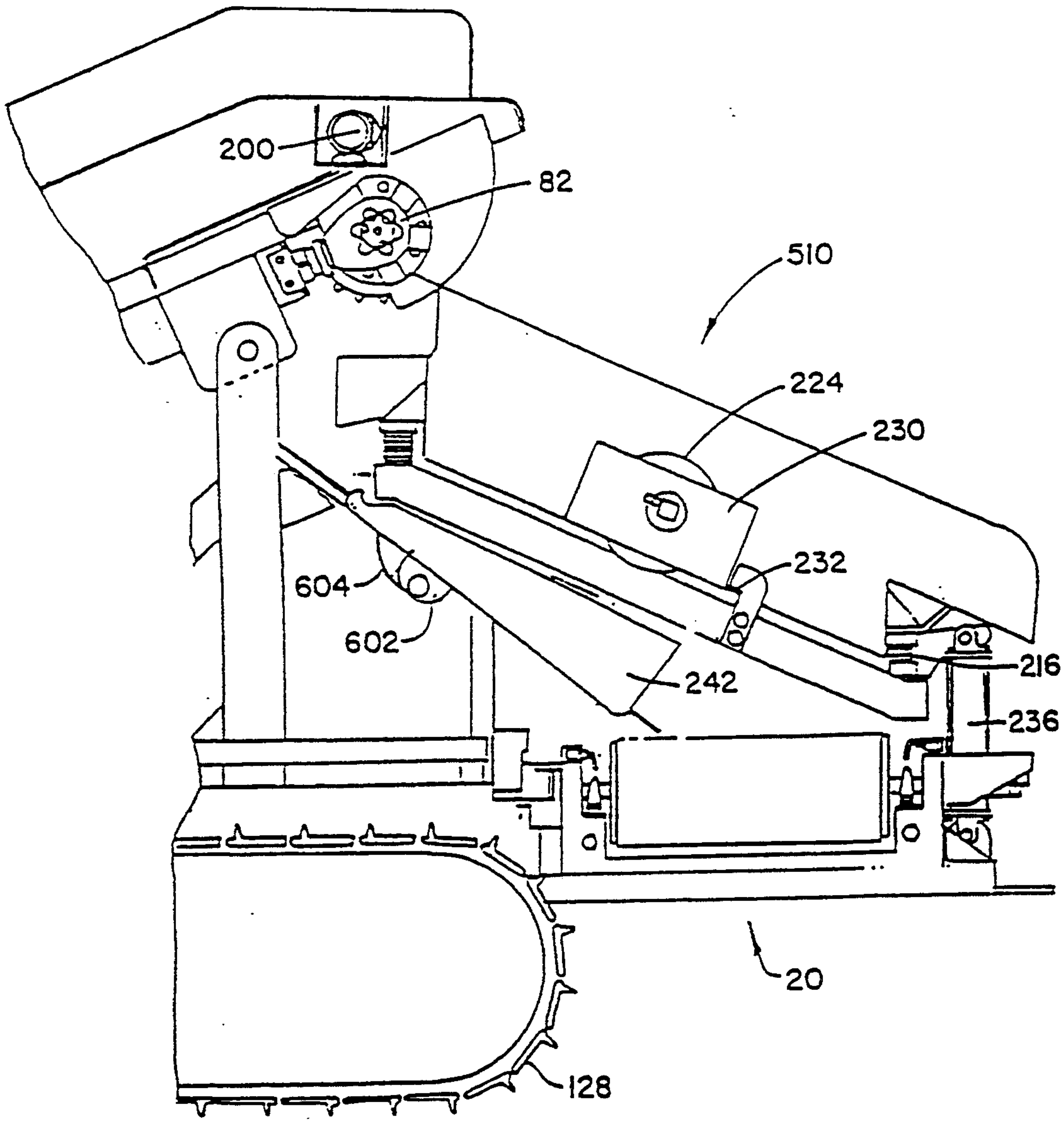
FIG. 27 is a fragmentary side elevational view of a separator section in the pipeline padding assembly illustrated in FIGS. 20–26.

Turning now to FIG. 27, the improved separator section 510 of pipeline padding apparatus 502 includes an electric vibrator apparatus which is mounted to fines chute 242. Electric vibrator 602 is powered via the electric system of support vehicle 504, and is supplied with electricity through an electric wire 604. An additional switch is provided in the control panel, if desired, to control the electricity that is supplied to vibrator 602. The provision of vibrator 602 further increases the efficiency by which fines are transmitted from the separator section 510 to conveyor section 512.

Figure 25:
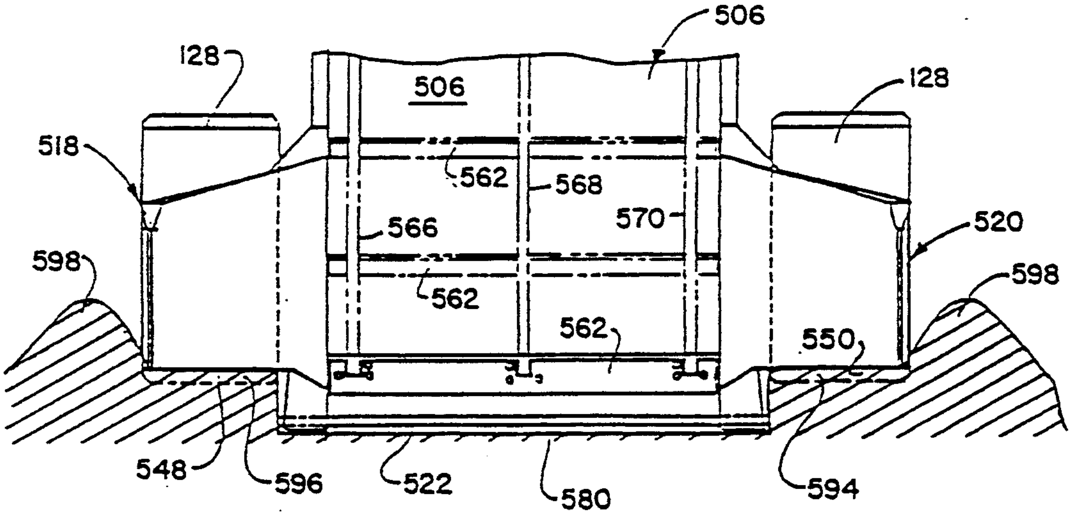
FIG. 25 is a second diagrammatical view illustrating operation of the pipeline padding assembly illustrated in FIGS. 20–24.

The operation of a pipeline padding apparatus 502 constructed according to the embodiment of FIGS. 20–27 will now be discussed. During pipeline padding, the elevator section 506 may be pivoted with respect to support vehicle 504 in order to compensate for the inclination of the underlying ground, as has been discussed with reference to FIGS. 13–16 of the drawings. As support vehicle 504 moves forward, the operator adjusts the level of cutter element 522 relative to the ground by pivoting elevator section 506 with respect to vehicle 504. In most conditions, cutter element 522 should ride within the pile of excavated spoil, not in the underlying ground. If the operator finds that conveyor section 512 is not providing enough fines to properly pad a pipeline, the level of cutter element 522 is lowered. In extreme circumstances, cutter element 522 may be lowered sufficiently enough to cut into the underlying ground. In these situations, the downward force provided by engine section 514 helps cutter element 522 maintain its lowered position. As can be seen in FIG. 25, the apparatus can process the native ground or earth materials to obtain fine material for padding a pipeline trough. During normal operating conditions, the presence of engine 514 helps dampen vibration of spoil guiding section 508, and contributes to the overall stability of vehicle 504. Rocks and other hard objects are intercepted and deflected upwardly by cutter element 522 into elevator section 506, so that damage to the underside of vehicle 504 is prevented.

As may be seen in FIG. 23, the cross section of spoil which is engaged by cutter element 522 is leveled out to a plane 580. Looking now to FIG. 25, it will be seen that spoil which passes beneath the bottom surfaces 548, 550 of guide members 518, 520, respectively, is leveled into smoothed out paths 594, 596. FIG. 24 provides a diagrammatical plan view of the smoothed out paths 594, 596. As may be seen in FIG. 24, paths 594, 596 are deliberately aligned with the left and right vehicle tracks 128 on support vehicle 504. As a result, spoil guiding section 508 creates a level path upon which tracks 128 can ride, which further contributes to the smoothness and stability of the pipeline padding apparatus 502 during operation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for padding pipe by separating fine material from spoil which is piled alongside an excavated trough and returning the fine material to the trough atop a pipeline positioned therein, comprising:
   - a support vehicle adapted for moving relative to a trough and associated spoil;
   - means on said vehicle for elevating spoil in an elevating direction from a forward end to a rearward end;
   - means connected to said forward end of said elevating means for guiding spoil into said elevating means;
   - separating means on said vehicle for receiving spoil from said elevating means and for separating the spoil into fine material and rough material;
   - conveying means on said vehicle for receiving the fine material from said separating means and for conveying the fine material into the trough; and
   - means for applying a downward force to said guide means, said downward forcing means being positioned elevated with respect to and at least partially forward of said forward end of said elevating means, whereby said guide means is more stable relative to the spoil during operation.

2. An apparatus according to claim 1, wherein said means for applying a downward force comprises an engine for powering said support vehicle, said engine being positioned at least partially above said guide means.

3. An apparatus according to claim 2, wherein said engine is mounted above and forward of said elevating means to avoid dust that may be generated by said elevating means during operation.

4. An apparatus according to claim 2, further comprising a hydraulic pump connected to said engine above said guide means, and at least one hydraulic pressure line extending from said pump to a corresponding hydraulic motor on one of said vehicle, said elevating means, said separating means and said conveying means, said pressure line being positioned externally of said vehicle in order to promote cooling of any hydraulic fluid therein during operation.

5. An apparatus according to claim 2, further comprising at least one step on said guide means for obtaining access to said engine.

6. An apparatus according to claim 1, wherein said downward forcing means comprises an engine and hydraulic pump assembly.

7. An apparatus according to claim 1, wherein said elevating means comprises an elevator floor, a plurality of flat members each having a smooth floor engaging surface and a spoil engaging surface and a plurality of driving chains connected to said flat members for driving said flat members in a path along said elevator floor.

8. A pipeline padding apparatus for separating fine material from spoil which is piled alongside an excavated trough and returning the fine material to the trough atop a pipeline positioned therein, comprising:

a vehicle adapted for moving relative to a trough and associated spoil;

spoil elevator on said vehicle for elevating spoil in an elevating direction from a forward end to a rearward end;

spoil guide connected to said forward end of said elevator for guiding spoil toward said forward end of said elevator;

spoil separator on said vehicle for receiving spoil from said elevator and for separating the spoil into fine material and rough material;

fine material conveyor on said vehicle for receiving the fine material from said separator and for conveying the fine material into the trough; and an engine for powering said support vehicle, said engine being positioned elevated with respect to and forward of said forward end of said spoil elevator, whereby said engine applies a downward force to stablize said spoil guide relative to the spoil during operation of the apparatus.

9. An apparatus according to claim 8, wherein said engine comprises an internal combustion engine having an exhaust stack positioned to emit exhaust above said engine.

10. An apparatus according to claims 9, wherein said engine further comprises a hydraulic pump for selectively providing power to said elevator, said separator, and said conveyor.

11. An apparatus according to claim 8, wherein said elevator further comprises: an elevator floor, a plurality of flat members each having a smooth floor engaging surface and a spoil engaging surface, and a plurality of driving chains connected to said flat members for driving said flat members in a path along said elevator floor.

12. An apparatus according to claim 11, wherein said plurality of driving chains consists of at least three driving chains connected to said flat members for driving said flat members in a path along said elevator floor.

* * * * *